United States Patent [19]
Dunfield et al.

[11] Patent Number: 5,729,404
[45] Date of Patent: *Mar. 17, 1998

[54] DISC DRIVE SPINDLE MOTOR WITH ROTOR ISOLATION AND CONTROLLED RESISTANCE ELECTRICAL PATHWAY FROM DISC TO GROUND

[75] Inventors: John C. Dunfield, Aptos; Klaus Kloeppel, Watsonville; Robert M. Pelstring, Santa Cruz; Michael Raffetto, Scotts Valley; Donald J. MacLeod, Santa Cruz; Frederick F. Kazmierczak, San Jose; Clifford T. Jue, Santa Cruz, all of Calif.

[73] Assignee: Seagate Technology, Inc., Scotts Valley, Calif.

[*] Notice: The term of this patent shall not extend beyond the expiration date of Pat. No. 5,485,331.

[21] Appl. No.: 611,285

[22] Filed: Mar. 6, 1996

Related U.S. Application Data

[63] Continuation of Ser. No. 188,479, Jan. 28, 1994, abandoned, which is a continuation-in-part of Ser. No. 129,655, Sep. 30, 1993, Pat. No. 5,485,331.

[51] Int. Cl.⁶ .................... G11B 17/02; G11B 33/14
[52] U.S. Cl. .................... 360/99.08; 360/97.02
[58] Field of Search .................... 360/99.08, 98.07, 360/99.04, 97.02; 369/72; 361/212, 220

[56] References Cited

U.S. PATENT DOCUMENTS

| | | | |
|---|---|---|---|
| 3,226,666 | 12/1965 | Lord | 439/23 |
| 3,234,495 | 2/1966 | Martinez | 439/25 |
| 3,610,714 | 10/1971 | De Gaeta | 384/425 |
| 3,744,326 | 7/1973 | Hetzel et al. | 74/128 |
| 3,786,288 | 1/1974 | Joannou | 369/263 |
| 3,832,020 | 8/1974 | McCloskey | 384/43 |
| 4,037,125 | 7/1977 | Aoki | 310/248 |
| 4,101,945 | 7/1978 | Butsch | 360/102 |
| 4,216,512 | 8/1980 | Vidwans | 360/133 |
| 4,368,398 | 1/1983 | Mabuchi | 310/248 |
| 4,378,138 | 3/1983 | Sohre | 339/5 R |
| 4,466,033 | 8/1984 | Jordan et al. | 360/99.05 |

(List continued on next page.)

FOREIGN PATENT DOCUMENTS

| | | | |
|---|---|---|---|
| 0 441 557 | 8/1991 | European Pat. Off. | 360/98.08 |
| 58-194101 | 11/1983 | Japan | 360/99.12 |
| 60-52953 | 3/1985 | Japan | 360/98.07 |
| 2-240888 | 9/1990 | Japan | 360/98.07 |

*Primary Examiner*—Craig A. Renner
*Attorney, Agent, or Firm*—Kinney & Lange, P.A.

[57] ABSTRACT

A disc drive for storing and retrieving data from at least one memory storage disc includes a drive base and a spindle motor. The spindle motor includes a rotor hub, a shaft, a bearing unit. The bearing unit rotatably supports the rotor hub about an axis. A controlled resistance electrical pathway is established from the rotor hub to ground to control disc potential and to prevent excess static charge buildup. In one embodiment, the spindle motor includes structural elements made of a conducting plastic having a controlled resistance to establish a controlled resistance electrical pathway from the rotor hub to ground. In a second embodiment, the shaft of the spindle motor includes a conductive contact button electrically connected to the shaft and operatively coupled with a contact shield electrically grounded by an electrical conductor having a controlled resistance. In another embodiment, the spindle motor includes a rod made of conductive material extending from an electrically grounded contact shield and received within the shaft. An electrical pathway between the shaft and the rod is established by a conducting fluid between the rod and the shaft. Alternatively, the electrical pathway from the shaft to the rod is established by a conducting unit. The conducting unit includes a seal, a magnetic conductive material, and a ferro-fluid. The seal is positioned within the shaft. The magnetic conductive material is coupled to the rod. The ferro-fluid is supported between the seal and the magnetic conductive material.

41 Claims, 16 Drawing Sheets

U.S. PATENT DOCUMENTS

| | | | |
|---|---|---|---|
| 4,572,285 | 2/1986 | Botts et al. | 165/104.28 |
| 4,577,248 | 3/1986 | Cantwell | 360/99.04 |
| 4,604,229 | 8/1986 | Raj et al. | 252/510 |
| 4,623,952 | 11/1986 | Pexton | 361/220 |
| 4,628,384 | 12/1986 | Raj et al. | 360/99.08 |
| 4,672,487 | 6/1987 | Brand et al. | 360/98.07 |
| 4,701,653 | 10/1987 | Merkle et al. | 310/152 |
| 4,779,165 | 10/1988 | Elsaesser et al. | 360/99.08 |
| 4,780,777 | 10/1988 | Biermeier et al. | 360/98.07 |
| 4,814,652 | 3/1989 | Wright | 360/98.07 |
| 4,817,964 | 4/1989 | Black, Jr. | 277/1 |
| 4,818,907 | 4/1989 | Shirotori | 360/99.08 |
| 4,831,295 | 5/1989 | Posedel | 310/72 |
| 4,841,408 | 6/1989 | Matsunaga et al. | 361/220 |
| 4,928,029 | 5/1990 | Wright | 360/99.08 |
| 4,943,748 | 7/1990 | Shiozawa | 360/98.07 |
| 4,985,792 | 1/1991 | Moir | 360/99.08 |
| 4,987,514 | 1/1991 | Gailbreath et al. | 361/220 |
| 4,999,724 | 3/1991 | McAllister et al. | 360/98.01 |
| 5,015,893 | 5/1991 | Shiozawa | 360/98.07 |
| 5,089,732 | 2/1992 | Konno et al. | 310/67 R |
| 5,112,146 | 5/1992 | Stangeland | 384/492 |
| 5,140,479 | 8/1992 | Elsing et al. | 360/97.01 |
| 5,142,173 | 8/1992 | Konno et al. | 360/98.07 |
| 5,163,757 | 11/1992 | Graham | 384/463 |
| 5,251,081 | 10/1993 | Cossette et al. | 360/97.02 |
| 5,295,029 | 3/1994 | Elsing et al. | 360/99.08 |
| 5,304,879 | 4/1994 | Suzuki et al. | 310/67 R |
| 5,337,374 | 8/1994 | Konishikawa | 384/107 |
| 5,367,416 | 11/1994 | Cossette et al. | 360/99.08 |
| 5,430,590 | 7/1995 | Ainslie et al. | 360/98.07 |
| 5,479,304 | 12/1995 | Morita | 360/98.07 |
| 5,485,331 | 1/1996 | Dunfield et al. | 360/99.08 |

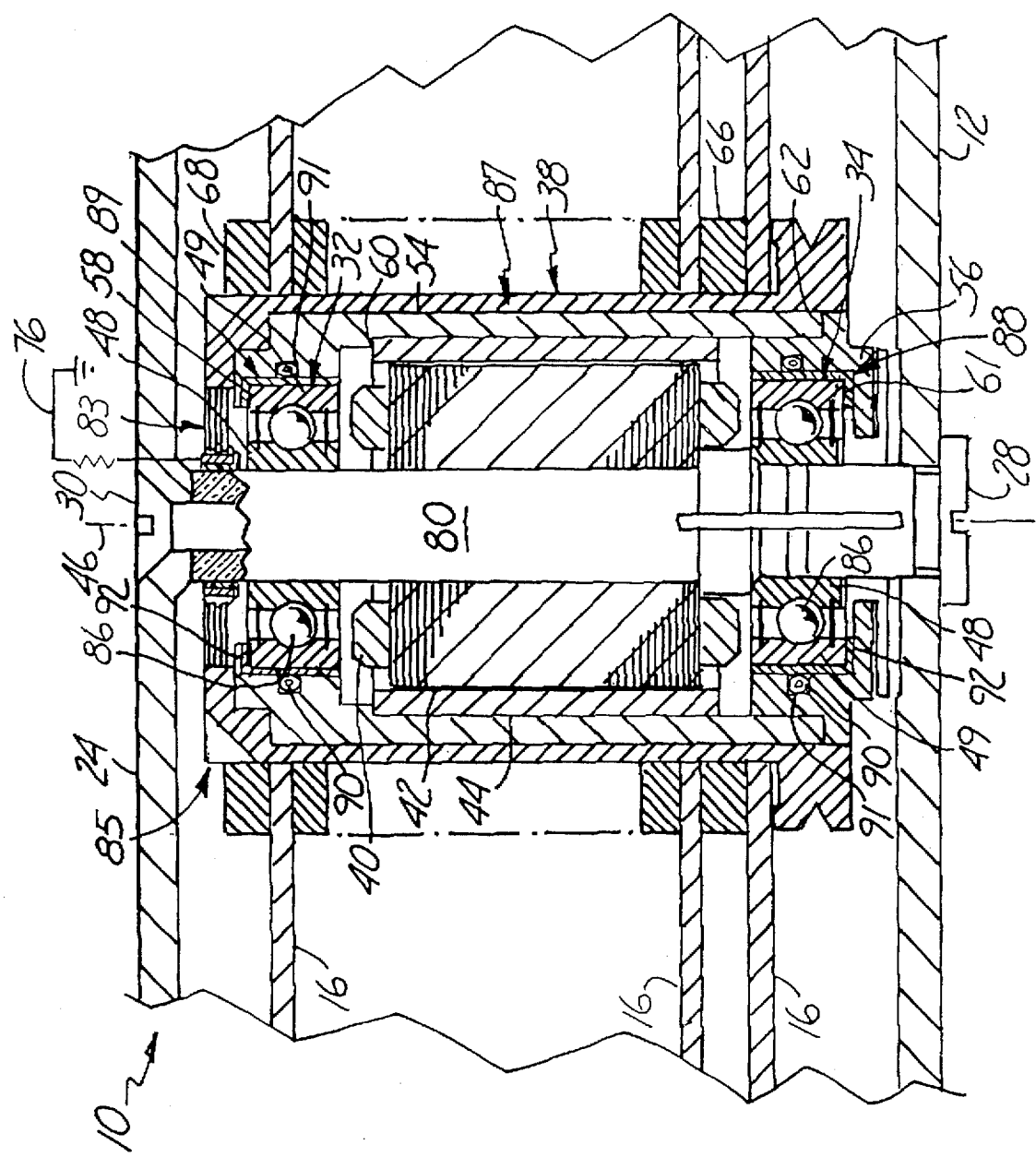

DISC DRIVE SPINDLE MOTOR WITH ROTOR ISOLATION AND CONTROLLED RESISTANCE ELECTRICAL PATHWAY FROM DISC TO GROUND

This is a file wrapper continuation of application Ser. No. 08/188,479, filed Jan. 28, 1994, now abandoned, which is a Continuation-in-part of application Ser. No. 08/129,655 filed Sep. 30, 1993, now U.S. Pat. No. 5,485,331, issued Jan. 16, 1996.

BACKGROUND OF THE INVENTION

The invention relates to disc drives. In particular, the invention relates to spindle motors for rotatably driving memory storage discs.

Magnetic disc drives act as mass storage devices for computers by selectively polarizing portions of a magnetic disc surface. In the continual effort to increase storage capacity of magnetic disc drives, the density of data stored on the disc has been continually increased by decreasing the size of the polarized portions of the disc surface. Reduction in the size of the magnetically polarized bit positions on the disc results in a decrease in the signal strength induced in the read/write head as the surface of the magnetic disc passes under it. Accurate data transfer to and from the disc requires minimizing extraneous signals or electronic "noise".

The magnetic disc typically rotates at speeds of up to 7200 rpm and is supported by a spindle rotor hub. Both are driven by a spindle drive motor. The spindle rotor hub is rotatably supported above a base of the spindle motor by ball bearings. Typically, the ball bearings in prior art spindle motors are made of steel, usually 52100 chrome steel.

Several key performance parameters including non-repeatable runout, acoustics, shock resistance, running friction and contamination are effected by properties of the ball bearings. Bearing geometry effects the rotation of the rotor hub and ultimately the rotation of the magnetic disc. With prior art spindle motors, rotation of the magnetic disc has been oval shaped rather than circular. This disuniformity, otherwise known as runout, has been tolerable as long as the runout repeats in a consistent pattern. However, due to waves in the bearing race and imperfect roundness of the bearing balls, inconsistent runout or nonrepeatable runout has become a problem. Inconsistent runout or nonrepeatable runout misaligns data tracks in relationship to the location of the read/write head. Consequently, nonrepeatable runout limits storage capacity of discs by limiting the number of tracks per inch on the discs.

The surface finish, the axial stiffness, and the radial stiffness of ball bearings also has an effect on the vibration of the spindle motor during rotation of the memory storage disc. Generally, the rougher the surface finish of the ball bearing, the greater the vibration. Ball bearing axial and radial stiffness ultimately affects motor axial and rocking frequencies. Motor axial and rocking frequencies are the frequencies at which the spindle motor resonates or vibrates. Vibration of the spindle motor creates undesirable acoustics or noise, prolongs the time required for reading and writing information to and from the magnetic disc, and may cause the magnetic head to "crash".

To limit vibration caused by the rough surface finish of ball bearings, grease or other lubrication material is used. However, grease increases friction torque. As a result, greater motor running power is needed to overcome the friction torque. In addition, the grease or lubricating material has an associated outgas or grease vapor. Contaminants carried by the grease vapor become deposited upon the surface of the magnetic disc. These contaminants damage the magnetic head as the magnetic head flies above the surface of the magnetic disc.

In addition, the ball bearings typically rotate within inner and outer races made of steel, usually 52100 chrome steel. The races are typically secured to adjacent components of the disk drive by adhesives. These adhesives have associated vapors which carry and deposit contaminating particles on the surface of the magnetic discs. These particles damage the magnetic head as the magnetic head flies above the surface of the disc.

The magnetic head stores and retrieves information on a magnetic disc. Several types of magnetic heads are currently in use, including metal-ingap (MIG) heads, thin film (TF) heads and magnetoresistive (MR) heads. Magnetoresistive heads use a magnetoresistive film to read information stored on magnetic discs. The magnetoresistive film is an extremely thin magnetic film which changes in resistance to electrical current as a function of the magnetic flux intercepted by it. For example, the resistance of the film will be high when it is in a strong magnetized region. As the magnetic disc moves past the magnetoresistive head, the polarity of the magnetic field in the region of the magnetoresistive head changes. This represents the information stored on the disc. As a result, the resistance of the magnetoresistive film also changes to affect the current flowing through it. Information on the magnetic disc is decoded by monitoring the current which flows through the magnetoresistive film. Because magnetoresistive heads have a signal independent of speed and are more accurate, data storage density can be increased when magnetoresistive heads are used. Because the magnetoresistive head, and in particular the magnetoresistive film, has current flowing through it, the magnetoresistive head is electrically active. As a result, contact between the magnetoresistive head and the magnetic disc causes an electrical short circuit which may permanently damage the head.

To prevent damage to the magnetoresistive head caused by short circuiting, the magnetic disc must be electrically isolated from ground. In the past, prior disc drives have isolated the magnetic disc from ground by isolation grommets between the spindle motor and the casting or by isolating the whole disc drive casting with rubber feet being attached to the bottom of the casting. However, using grommets or rubber feet for isolation increases manufacturing complexity and increases the space required by the disc drive.

In the process of rotation, considerable static electrical charge is built up on the disc and spindle. This disc potential causes electrical arcs or sparks between the disc and the magnetic head which floats above the disc during rotation of the disc. In inductive read/write magnetic heads, this spark often causes undesirable acoustics or noise and prolongs the time required for reading and writing information to and from the magnetic disc. With magnetoresistive heads, the spark may permanently damage the magnetoresistive head. Consequently, an electrical pathway to eliminate excess static charge and to control disc potential must also be provided. However, the static elimination system, itself, must not generate interfering noise. Establishing and controlling this electrical pathway is further complicated because of the unpredictable conductivity of the ball bearing assemblies typically used in disc drive spindle motors and the layers of adhesives typically used in the construction of disc drive spindle motors. The conductivity of the ball bearing assemblies is difficult to control because the resistance or conductivity is effected by several different variables including contact loads and temperature changes. As a result, the resistance of the ball bearing assemblies is unknown and uncontrollable. Consequently, consistent and reliable static discharge has been difficult to achieve.

In an attempt to provide consistent and reliable static discharge, several structures have been added to disc drives. These structures include exterior mounted gimbal and leaf spring elements held in constant electrical contact with the end of the rotating spindle motor shaft, and conductive fibers or fingers which are attached to the hub and which constantly contact the spindle motor shaft along a radius of the shaft. Both structures have inherent drawbacks. The exterior mounted gimbal and leaf springs require the shaft to extend outside of the disc enclosure. Consequently, this design adds height to the disc drive and wastes precious space. This additional space is not available in small, low profile disc drives. Similarly, the conductive fibers or fingers also require additional precious space within the spindle motor. In addition, because the conductive fibers or fingers are held in constant contact against the radius of the spindle motor shaft rather than along the centerline of the shaft, rotational drag on the shaft is increased.

SUMMARY OF THE INVENTION

The present invention is an improved disc drive. The disc drive includes a drive base, a spindle motor, at least one memory storage disc. In one embodiment, the disc drive includes an improved spindle motor. The spindle motor includes a rotor hub, a shaft, a bearing sleeve, and a bearing unit. The shaft is centered along an axis. The bearing sleeve surrounds the shaft. The bearing unit is located between the bearing sleeve and the shaft. The bearing unit includes an inner race, an outer race and a bearing ball. The inner race is secured to the shaft. The outer race is secured to the bearing sleeve. The bearing ball is fitted between the inner race and the outer race. The bearing ball rotatably supports the inner race relative to the outer race, therefore, supporting the rotor hub about the axis.

When used in conjunction with magnetoresistive heads, the motor electrically isolates the hub from the base to protect the magnetoresistive heads from damage caused by accidental electrical short circuiting between magnetoresistive heads and ground. The motor uses one of several means for isolating the hub from the base, including structural elements being made of high resistivity materials and high resistivity isolating inserts or coatings. The structural elements made of high resistivity material include: the bearing sleeve, the bearing bails and the shaft. The high resistivity isolating inserts are positioned between the bearing sleeve and the bearing unit or between the shaft and the bearing unit. The coating is applied to a surface of the bearing sleeve.

In addition to electrically isolating the hub from the base, the motor also provides a controlled resistance electrical pathway from the rotor hub to ground to control disc potential and to prevent excess static charge buildup. The motor may use one of several arrangements to provide a controlled resistance electrical contact with the rotor hub to ground. In a first set of embodiments, the bearing sleeve or the high resistivity isolating inserts are made from a conducting plastic. The conducting plastic provides an electrical connection to the hub to drain excess static charge buildup.

In another embodiment of the motor, a controlled resistance electrical contact with the rotor hub is established by a controlled resistance electrical pathway between a ferro-fluid seal and ground. The ferro-fluid seal is positioned between an outer support flange of the rotor hub and a high resistivity isolator attached to the shaft.

In yet other embodiment of the motor, a controlled resistance electrical contact with the rotor hub is established by a controlled resistance electrical pathway between the shaft and an electrically grounded fixed conductive contact shield. Several structures are used to establish a controlled resistance electrical pathway between the shaft and the electrically grounded fixed conductive contact shield. In a first structure, a contact button with a contact area is received in the shaft. A loaded compression spring bears against the face of the contact button and the shaft to urge the contact button against the fixed conductive shield. Consequently, electrical contact with the rotor hub is re-established when the contact button is forced into contact with the electrically grounded fixed conductive contact shield.

In a second structure, the rod extends upwardly from the conductive contact shield and is received in the shaft. The rod is electrically coupled to the shaft while permitting the shaft to rotate about the rod. In one embodiment, an electrical pathway between the rod and the shaft is established by a fluid conducting unit. In another embodiment, an electrical pathway between the shaft and the rod is established by a highly coherent conducting fluid.

In another embodiment of the disc drive, the disc drive includes an improved drive base. The drive base includes an interface surface for coupling with the spindle motor. The interface surface includes a layer of high resistivity material so that the spindle motor is electrically isolated from the base.

BRIEF DESCRIPTION OF THE DRAWINGS

FIG. 6 is a cross-sectional view of a third embodiment of the spindle motor.

DETAILED DESCRIPTION OF THE PREFERRED EMBODIMENTS

Figure 2:
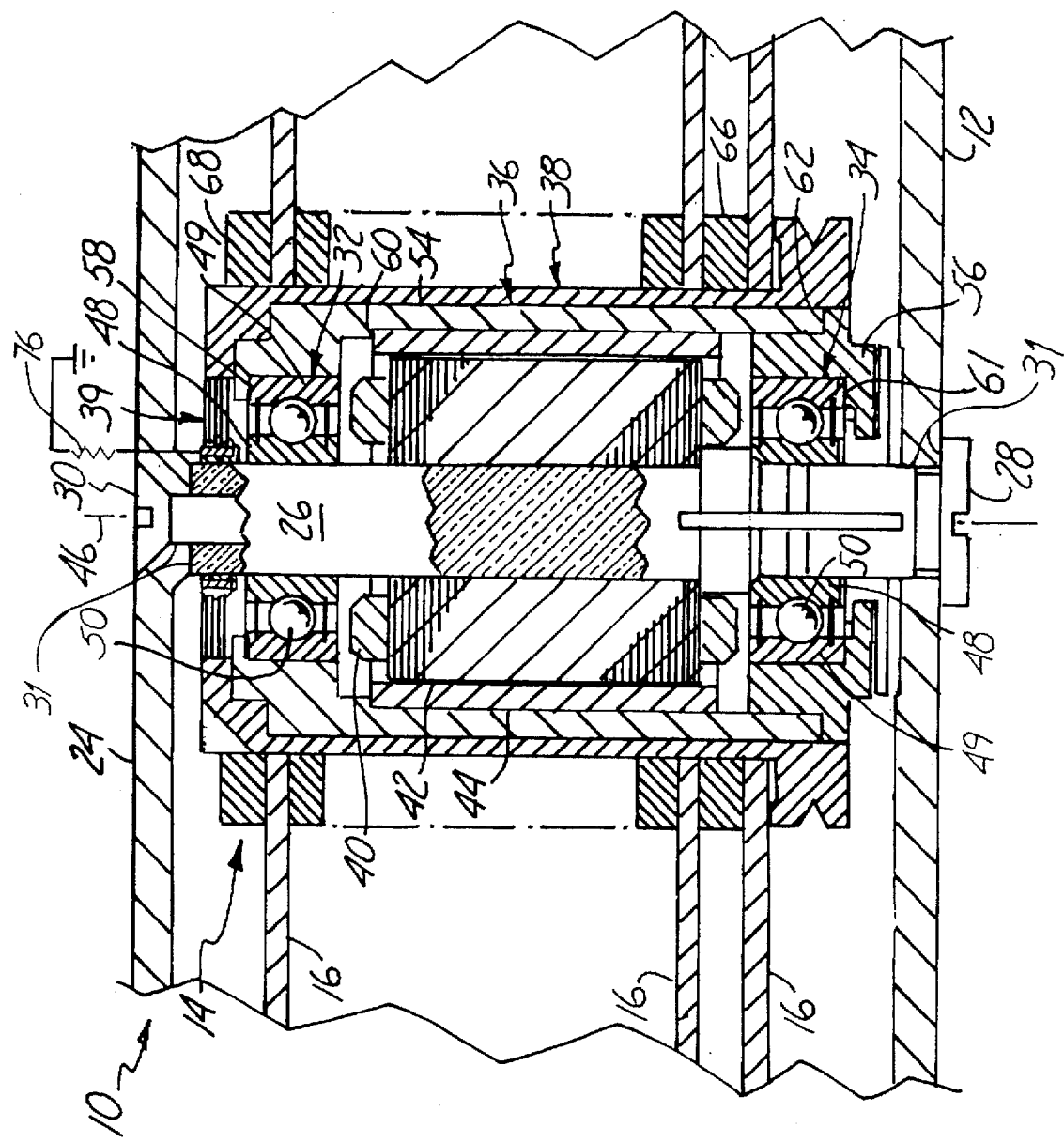
FIG. 2 is a cross-sectional view of a first embodiment of the disc drive and spindle motor of FIG. 1 taken along line 2—2 of FIG. 1.
Figure 3:
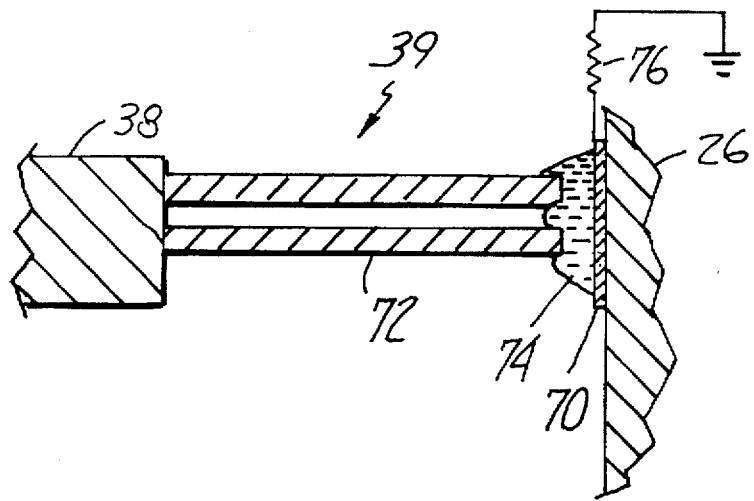
FIG. 3 is an enlarged fragmentary cross-sectional view of a fluid seal unit of the spindle motor of FIG. 2.

1. First Embodiment (FIGS. 1–3)

Figure 1:
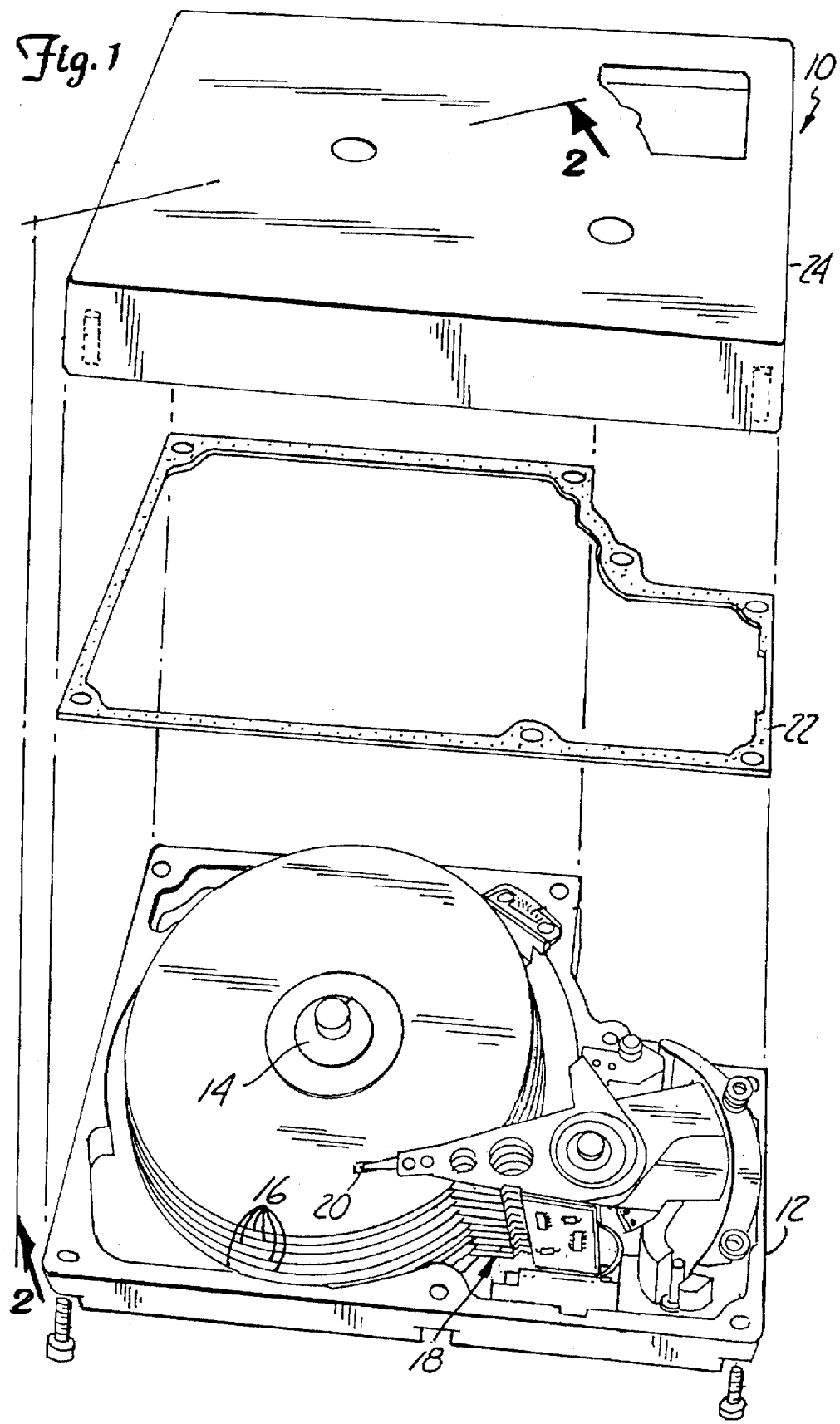
FIG. 1 is an exploded perspective view of a disc drive having a spindle motor.

FIG. 1 is an exploded perspective view of disc drive 10. Disc drive 10 includes bottom casing or base 12, spindle motor 14, memory storage discs 16, actuator 18, magnetic head 20, gasket 22 and top casing 24.

Spindle motor 14 is mounted to base 12. Spindle motor 14 rotatably supports memory storage discs 16 above base 12.

Actuator 18 is well-known in the art and is mounted above base 12 so as to arcuately extend over memory storage discs 16. Actuator 18 carries at least one read-write magnetic head 20 above memory storage discs 16. Preferably, magnetic head 20 comprises a magnetoresistive (MR) head.

Gasket 22 is mounted between base 12 and top casing 24. Top casing 24 is mounted to base 12. Base 12, gasket 22, and top casing 24 enclose discs 16, actuator 18, and magnetic head 20 to provide a relatively contaminant free environment for memory storage discs 16.

In operation, spindle motor 14 causes memory storage discs 16 to rotate. At sufficiently high speeds, rotation of discs 16 causes magnetic head 20 to lift-off the surface of disc 16 due to aerodynamic properties of magnetic head 20. After take off, magnetic head 20 flies over the surface of discs 16 as discs 16 rotate. Actuator 18 positions magnetic head 20 over the surface of disc 16. Actuator 18 shown in FIG. 1 is a rotary actuator which positions magnetic head 20 along an arch over surface of disc 16. However, actuator 18 may also comprise a linear actuator, thereby positioning magnetic heads 20 linearly along a radius of magnetic discs 16.

FIG. 2 shows the cross sectional view of disc drive 10 take in along line 2—2 of FIG. 1. Disc drive 10 includes base 12, spindle motor 14, memory storage discs 16 and top casing 24.

As is generally known in the art, spindle motor 14 is a fixed shaft spindle motor and includes structural elements including shaft 26, screws 28 and 30, upper bearing unit 32, lower bearing unit 34, bearing sleeve 36, rotor hub 38, fluid seal unit 39, armature winding 40, armature laminations 42, and magnetic sleeve 44.

Shaft 26 is a cylindrical shaft formed from a high resistivity material, mixture or composite. Preferably, the high resistivity material, mixture or composite has a resistance greater than about 10 megohms. Preferably, shaft 26 is formed from a ceramic compound, such as silicon nitride. Shaft 26 is fixedly secured to base 12 and to top casing 24 by screws 28 and 30, respectively. Shaft 26 is centered along an axis 46. Screw 30 is fastened through top casing 24 into a threaded bore at an upper end of shaft 26. Screw 28 is fastened through base 12 into a threaded lower end of shaft 26. Shaft 26 and screws 28, 30 contact base 12 and top casing 24 along interface surfaces 31 of base 12 and top casing 24.

Shaft 26 supports and accommodates upper bearing unit 32 and lower bearing unit 34 above base 12. Shaft 26 also carries and supports armature windings 40 and armature laminations 42 above base 12 and within rotor hub 38.

As is generally known in the art, upper bearing unit 32 and lower bearing unit 34 each include inner race 48, outer race 49 and bearing balls 50. Bearing units 32 and 34 comprise a pair of precision ball bearing units each having annular inner race 48 cooperating with annular outer race 49 to contain an annular array of bearing balls 50 therebetween. Inner race 48, outer race 49 and bearing balls 50 are preferably formed from 52100 chrome steel, as is generally known in the art. Inner race 48 of upper bearing unit 32 is bonded onto a relatively small diameter upper end of shaft 26. Similarly, inner race 48 of lower bearing unit 34 is bonded onto a relatively small diameter lower end of shaft 26. Outer races 49 are secured to bearing sleeve 36. Bearing units 32 and 34 rotatably support bearing sleeve 36, rotor hub 38 and memory storage discs 16 above base 12 and about axis 46.

Bearing sleeve 36 includes upper bearing support member 54 and lower bearing support member 56. Upper bearing support member 54 is generally a hollow cylinder having an inner bore and includes upper bearing shoulder 58 and lower shoulder 60. Lower bearing support member 56 is generally a hollow cylinder having an inner bore and includes inner bearing shoulder 61 and outer shoulder stop 62.

Upper bearing support member 54 is mounted within rotor hub 38. Upper bearing unit 32 abuts upper bearing shoulder 58 and is mounted between upper bearing support member 54 and shaft 26. Upper bearing support member 54 interfaces between upper bearing unit 32 and rotor hub 38. Lower shoulder 60 provides a surface for positioning magnetic sleeve 44 within bearing sleeve 36. Upper bearing support member 54 carries magnetic sleeve 44.

A bottom end of upper bearing support member 54 mount to outer shoulder stop 62 of lower bearing support member 56 inner bearing shoulder 61 of lower bearing support member 56 supports lower bearing unit 34. Lower bearing support member 56 supports lower bearing unit 34 and rotor hub 38.

Rotor hub 38 includes spacer rings 66 and clamp 68. Rotor hub 38 is generally cylindrical and includes an inner bore sized to accommodate shaft 26, upper bearing unit 32, lower bearing unit 34, bearing sleeve 36, armature windings 40, armature laminations 42 and magnetic sleeve 44.

Rotor hub 38 is positioned between discs 16 and bearing sleeve 36. Rotor hub 38 is preferably formed from stainless steel as is conventionally known in the art. Rotor hub 38 substantially encloses and surrounds bearing sleeve 36. Shaft 26 extends through the inner bore of rotor hub 38. Rotor hub 38 is centered about axis 46. Rotor hub 38 is rotatably supported above base 12 and about axis 46 by upper and lower bearing units 32 and 34. Rotor hub 38 supports a stack of memory storage discs 16.

Spacer rings 66 each have a precision height, and are positioned adjacent discs 16. Spacer rings 66 encircle rotor hub 38. Spacer rings 66 orient discs 16 in a precision spacing for access by magnetic heads between discs 16.

Clamp 68 is ring-shaped and encircles rotor hub 38. Clamp 68 is positioned on top of the stack of discs 16. Clamp 68 compresses the stack of discs 16 and related spacer rings 66 to hold discs 16 in place.

As is well-known in the art, shaft 26 carries armature windings 40 and armature laminations 42 within the inner bore of outer support flange 48. Magnetic sleeve 44 is secured to bearing sleeve 36 with the inner bore of bearing sleeve 36. Armature windings 40 and armature laminations 42 are positioned concentrically within magnetic sleeve 44. Upon supply of electrical power to armature windings 40, and under appropriate control as is known in the art, the flux coupling between armature windings 40 and magnetic sleeve 44 results in rotational driving of hub 38, all in a well-known manner. Consequently, spindle motor 14 rotatably drives memory storage discs 16 about axis 46.

As best shown in FIG. 3, fluid seal unit 39 interfaces between shaft 26 and rotor hub 38. Fluid seal unit 39 includes magnetic ring 70, seal ring 72, ferro-fluid 74 and electrical conductor 76. Seal ring 72, magnetic ring 70 and ferro-fluid 74 comprise conventional exclusion ferro-fluid seals as are known in the art. Seal ring 72 is mounted at the top end of rotor hub 38 and defines radially inwardly presented exclusion fluid seal face in running engagement with magnetic ring 70. Magnetic ring 70 is secured to shaft 26. Ferro-fluid 74 is suspended between seal ring 72 and magnetic ring 70. Ferro-fluid 74 interfaces between shaft 26 and rotor hub 38 to prevent migration of bearing contaminants or the like into contact with memory storage discs 16. Electrical conductor 76 extends from magnetic ring 70 to ground. Electrical conductor 76 provides a controlled resistance to ground by which excess static charge build Lip on discs 16 and rotor hub 38 is drained.

Spindle motor t4 electrically isolates rotor hub 38 from base 12 and further provides a controlled resistance to ground by which disc potential and static charge build-up may be controlled. Because shaft 26 is made from high resistivity material, preferably ceramic material, rotor hub 38 and memory storage discs 16 carried by rotor hub 38 are electrically isolated from base 12. As a result, spindle motor 14 prevents damage to magnetoresistive heads caused by short circuiting between magnetoresistive heads and ground. Because spindle motor 14 electrically isolates rotor hub 38 from base 12, the disc drive does not need to be isolated with rubber feet being attached to the bottom of base 12. Spindle motor 14 reduces manufacturing complexity and decreases the space required by the disc drive.

At the same time, electrical conductor 76 provides a controlled resistance to ground to drain excess static charge build up within rotor hub 38 and on memory storage discs 16. Consequently, damage to magnetoresistive heads caused by static charge buildup is prevented.

2. Second Embodiment (FIGS. 4–5)

Figure 5:
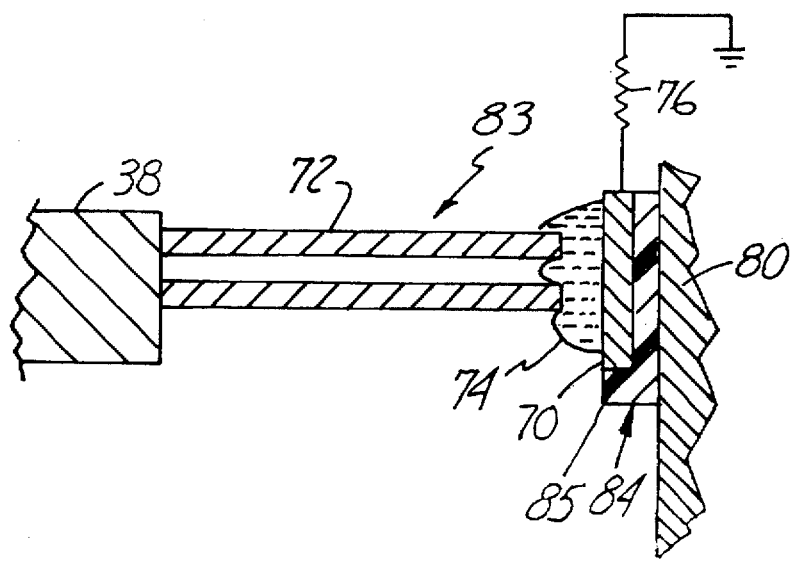
FIG. 5 is an enlarged fragmentary cross-sectional view of a ferro-fluid seal unit of the spindle motor of FIG. 4.
Figure 4:
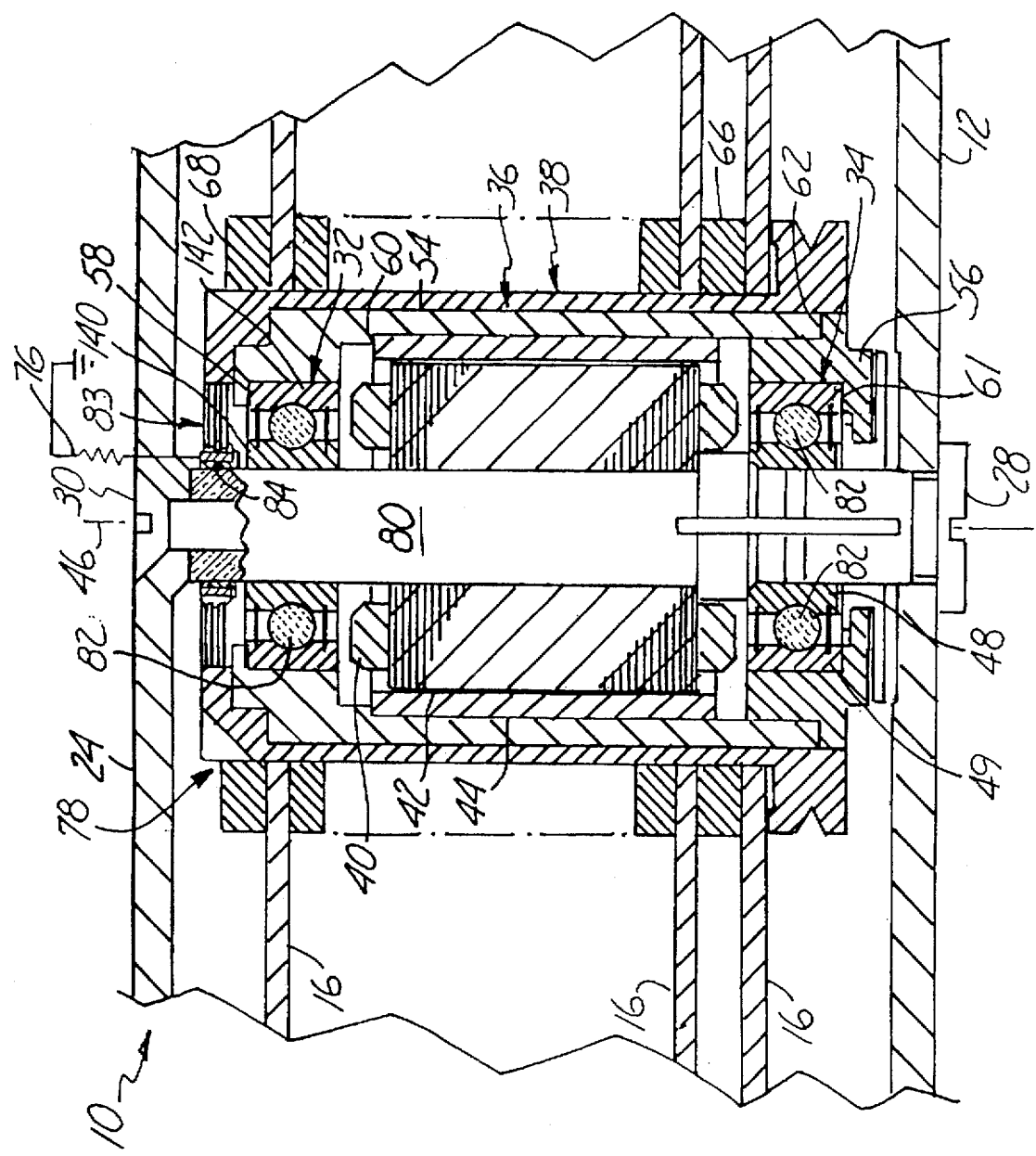
FIG. 4 is a cross-sectional view of a second embodiment of the spindle motor.

FIGS. 4 and 5 show an alternate embodiment 78 of spindle motor 14 taken along lines 2—2 of FIG. 1. FIG. 4 is a cross-sectional view of spindle motor 78. FIG. 5 is an enlarged fragmentary cross-sectional view of ferro-fluid seal 83 of spindle motor 78. For sake of illustration, those elements of spindle motor 78 which are the same as the corresponding elements of spindle motor 14 are numbered similarly. Spindle motor 78 is similar to spindle motor 14 except that shaft 26 is replaced with shaft 80, bearing balls 50 are replaced with bearing balls 82, and that fluid seal unit 39 is replaced with fluid seal unit 83. Unlike shaft 26, shaft 80 of spindle motor 78 is formed from 430F stainless steel, as is conventionally known in the art. Bearing bails 82 are formed from a high resistivity material, mixture, or composite. Preferably, the high resistivity material, mixture, or composite has a resistance greater than about 10 megohms. Preferably, bearing balls 82 are formed from ceramic material such as silicon nitride. Alternatively, bearing balls 82 are made of ruby (i.e., chromium doped $Al_2O_3$). Bearing balls 82 are compliantly fitted between inner race 48 and outer race 49 to accommodate for differences in thermal expansion between the high resistivity material of bearing balls 82 and the steel material of inner race 48 and outer race 49. Alternatively, inner race 48 and outer race 49 may also be formed from nonconductive material, such as a ceramic.

As best shown in FIG. 5, fluid seal unit 83 is similar to fluid seal unit 39 of spindle motor 14, except that fluid seal unit 83 further includes isolating insert 84. Isolating insert 84 is ring-shaped and includes an outward extending lip 85. Isolating insert 84 is formed from a high resistivity material such as ULTEM by G. E. Plastics. Alternatively, a substantially nonconductive mixture or composite of materials having a high resistivity is used. Preferably, the high resistivity material, mixture or composite has a resistance greater than about 10 megohms.

Isolating insert 84 is positioned between shaft 80 and magnetic ring 70. Lip 85 of isolating insert 84 extends below magnetic ring 70. Isolating insert 84 is preferably press-fit along shaft 80. Magnetic ring 70 is preferably press-fit around isolating insert 84. Alternatively, isolating insert 84 may be secured to shaft 80 by adhesive, such as 1838L by the 3M Company. Magnetic ring 70 may also be secured to isolating insert 84 by adhesive, such as 1838L by the 3M Company. Isolating insert 84 electrically isolates magnetic ring 70 and upper end of rotor hub 38 front shaft 80.

Bearing balls 82 and isolating insert 84 electrically isolate rotor hub 38 from base 12. Bearing balls 82 electrically isolate inner races 48 from outer races 49. Isolating insert 84 electrically isolates an upper end of rotor hub 38 from shaft 80. As a result, rotor hub 38 is electrically isolated from shaft 80 and base 12. By electrically isolating rotor hub 38 from base 12, spindle motor 78 prevents damage to magnetoresistive heads caused by short circuiting between magnetoresistive heads and ground.

Electrical conductor 76 of fluid seal unit 83 reestablishes electrical contact with rotor hub 38 and provides a controlled resistance to ground to control disc potential and to drain excess static charge buildup within rotor hub 38 and memory storage discs 16. In lieu of electrical conductor 76, insert 84 may be formed from a conducting plastic having a resistance greater than 10 megohms but low enough so as to allow static discharge, such as ULTEM by G. E. Plastics with a conductive additive such as carbon. Polyether ether ketone (PEEK) may also be used with a conductive additive such as carbon. As a result, spindle motor 78 prevents damage to magnetoresistive heads caused by static charge buildup.

In addition, bearing balls 82 provide several other advantages not limited to disc drives having magnetoresistive heads. Table A compares the material properties of 52100 chrome steel, synthetic ruby and silicon nitride. Table B compares bearing properties of bearing balls and bearing races made of conventional 52100 chrome steel with ceramic bearing balls and chrome races (hybrid) and with ceramic bearing balls and ceramic bearing races (full ceramic). Ruby bearing balls and races have bearing properties approximately equal to those of ceramic bearing balls and races.

TABLE A

| MATERIAL PROPERTY | 52100 CHROME STEEL | SYNTHETIC RUBY | SILICON NITRIDE |
|---|---|---|---|
| Young's Modulus (Mpa) | 2.07E+5 | 4.40E+5 | 3.31E+5 |
| Compressive Strength (Mpa) | 4.21E+3 | 2.10E+5 | 9.65E+3 |
| Tensile Strength (Mpa) | 1.57E+3 | 0.19E+3 | 1.00E+3 |
| CTE (Mpa) | 12.0E-6 | 6.2E-6 | 2.9E-6 |
| Hardness (Rc) | 60–67 | >70 | 78 |
| Density (kg/m$^{**3}$) | 7750 | 3970 | 3188 |

TABLE B

| BEARING PROPERTIES | 52100 CHROME STEEL | HYBRID | FULL CERAMIC |
|---|---|---|---|
| Ball Surface Finish | <.5 μinches | .1–.2 μinches | .1–.2 μinches |
| Ball Sphericity | <3 μinches | <1 μinch | <1 μinch |
| Repeatable Runout | <200 μinches | <200 μinches | <200 μinches |
| Non-Repeatable Runout | 5–15 μinches | | |
| Dynamic Load Rating | 1 | | |
| Axial Stiffness | 22,065 lbs/inch | 24,528 lbs/inch | 27,742 lbs/inch |
| Radial Stiffness | 147,000 lbs/inch | 167,000 lbs/inch | 195,624 lbs/inch |
| Max Contact Stress (Inner Race) | 189 kpsi | 215 kpsi | 251 kpsi |
| Motor Axial Frequency | 1 | 1.05 | 1.12 |
| Motor Rocking Frequency | 1 | 1.07 | 1.15 |

(A) Strength is highly dependent on probability of material defect in stress zone. Compressive strength is Hertzian.

Bearing balls 82 formed from ruby or ceramic material such as silicon nitride are advantageous over conventional 52100 chrome steel bearing balls. Bearing balls 82 formed from ruby or ceramic material such as silicon nitride result in improvements in ball bearing axial and radial stiffness and ultimately motor axial and rocking frequencies. In addition, bearing balls 82 formed from a ceramic material such as silicon nitride have improved ball surface finish and sphericity. Consequently, ball bearing balls 82 formed from ceramics improve acoustics and non-repetitive runout.

In addition, because bearing balls 82 formed from ruby or ceramics are smoother and have a lower coefficient of friction then conventional chrome steel balls, bearing units 32 and 34 require little or no grease. By reducing the amount of grease within bearing units 32 and 34, friction torque is largely reduced. Consequently, less motor running power is needed to overcome friction torque. In addition, by lowering the amount of grease required by bearing units 32 and 34, bearing bails 82 made of ruby or ceramics also lower the possibility of disc contamination caused by grease. Furthermore, because bearing balls 82 are made of ruby or ceramics and have a higher modulus of elasticity, less surface area of members 82 is in contact with inner races 48 and outer races 49. As a result, bearing balls 82 do not wear as quickly and have a longer useful life. As compared to bearing bails made of ceramics, ruby bearing balls are less expensive.

3. Third Embodiment (FIG. 6)

FIG. 6 is a cross-sectional view of an alternate embodiment 85 of spindle motor 78 shown in FIGS. 4 and 5. For sake of illustration, those elements of spindle motor 85 which are the same as the corresponding elements of spindle motor 78 are numbered similarly. Spindle motor 85 is similar to spindle motor 78, except that bearing balls 82 are replaced with bearing balls 86 and that bearing sleeve 36 is replaced with bearing sleeve 87. Spindle motor 85 further includes isolating inserts 88,89 and canted springs 90.

Unlike bearing balls 82 of spindle motor 78, bearing balls 86 of spindle motor 85 are formed from 52100 chrome steel, as is conventionally known in the art. Unlike bearing sleeve 36 of spindle motor 78, bearing sleeve 87 of spindle motor 85 further includes annular grooves 91. Annular grooves 91 extend into bearing sleeve 87 adjacent upper bearing unit 32 and lower bearing unit 34.

Canted springs 90 are coil springs which are slanted to provide both a radial load and an axial load. Canted springs 90 are made from beryllium, copper and stainless steel materials. Canted springs 90 are provided by Bal Seal Engineering Company, Inc. in Santa Anna, Calif. Canted springs 90 fit within annular grooves 91. Canted springs 90 provide a radial load and an axial load to maintain pressure on inserts 88 and 89. As a result, mechanical stability problems such as creep are prevented.

Isolating inserts 88,89 are ring-shaped and have an inward protruding lip 92. Isolating inserts 88,89 preferably have a material thickness of about 0.004 inches. Isolating inserts 88,89 are formed from a high resistivity material. Preferably, inserts 88,89 are formed from a relatively soft, impressionable, high resistivity material such as plastic. Alternatively, a mixture or composite of materials having a high resistivity may be used. Preferably, the high resistivity material, mixture or composite has a resistance greater than about 10 megohms.

Isolating insert 88 is positioned between lower bearing support member 56 of bearing sleeve 87 and outer race 49 of lower bearing unit 34. Lip 92 of isolating insert 88 abuts inner bearing shoulder 61 of lower bearing support member 56. Isolating insert 89 is positioned between upper bearing support member 54 and outer race 49 of upper bearing unit 32. Lip 96 of isolating insert 89 abuts bearing shoulder 58 of upper bearing support member 54. Inserts 88 and 89 are preferably press-fit within the inner bore of upper bearing support member 54 and lower bearing support member 56. Alternatively, inserts 88 and 89 may be attached to bearing sleeve 87 by adhesive, such as 1838L by the 3M Company.

Because inserts 88 and 89 are formed from high resistivity material, inserts 88 and 89 electrically isolate bearing units 34 and 32, respectively, from bearing sleeve 87 and rotor hub 38. Fluid seal unit 83 electrically isolates rotor hub 38 from shaft 80. Because inserts 88, 89 and fluid seal unit 83 electrically isolate rotor hub 38 from base 12, spindle motor 85 prevents damage to magnetoresistive heads caused by electrical short circuiting between magnetoresistive heads and ground. Moreover, because spindle motor 85 electrically isolates rotor hub 38 from base 12, rubber feet or isolation coatings are not required to electrically isolate the entire disc drive from ground.

Electrical conductor 76 of fluid seal unit 83 additionally reestablishes electrical contact with rotor hub 38 and provides a controlled resistance to ground to control disc potential and to drain excess static charge buildup within rotor hub 38 and memory storage discs 16. Alternatively, disc potential and excess static charge build-up may be controlled by isolating inserts 88,89 formed from a partially conducting plastic having a resistance greater than 10 megohms but low enough so as to allow static discharge, such as ULTEM by G. E. Plastics with a conductive additive such as carbon. Inserts 88,89 may also be formed from polyether ether ketone (PEEK) with a conductive additive such as carbon.

In addition, inserts 88,89 formed from an impressionable material provide several other advantages not limited to disc drives have magnetoresistive heads. Inserts formed from a relatively soft, impressionable material such as plastic permit outer races 49 to be coupled to bearing sleeve 87 without adhesives. Inserts 88,89 formed from impressionable material are preferably press fit against bearing sleeve 87. Likewise, outer races 49 of bearing units 32,34 are press fit within inserts 89,88 respectively. As a result, the relatively soft, impressionable material comprising inserts 88,89 is compressed to grip outer races 49 and bearing sleeve 87 and to couple and support outer races 49 to bearing sleeve 87. Reducing the amount of adhesives within spindle motor 85 reduces or eliminates contaminating particles from adhesive vapors from being deposited upon disc 16. As a result, inserts 88,89 formed from a relatively soft, impressionable material eliminate or reduce damage to heads caused by contaminants deposited upon disc 16.

Furthermore, inserts 88,89 also act as a noise barrier to limit disc drive noise created by spindle motor 85. Inserts 88,89 lower the decibel level of noise generated by spindle motor 85. Thus, disc drive 10 is quieter during operation.

4. Fourth Embodiment (FIG. 7)

Figure 7:
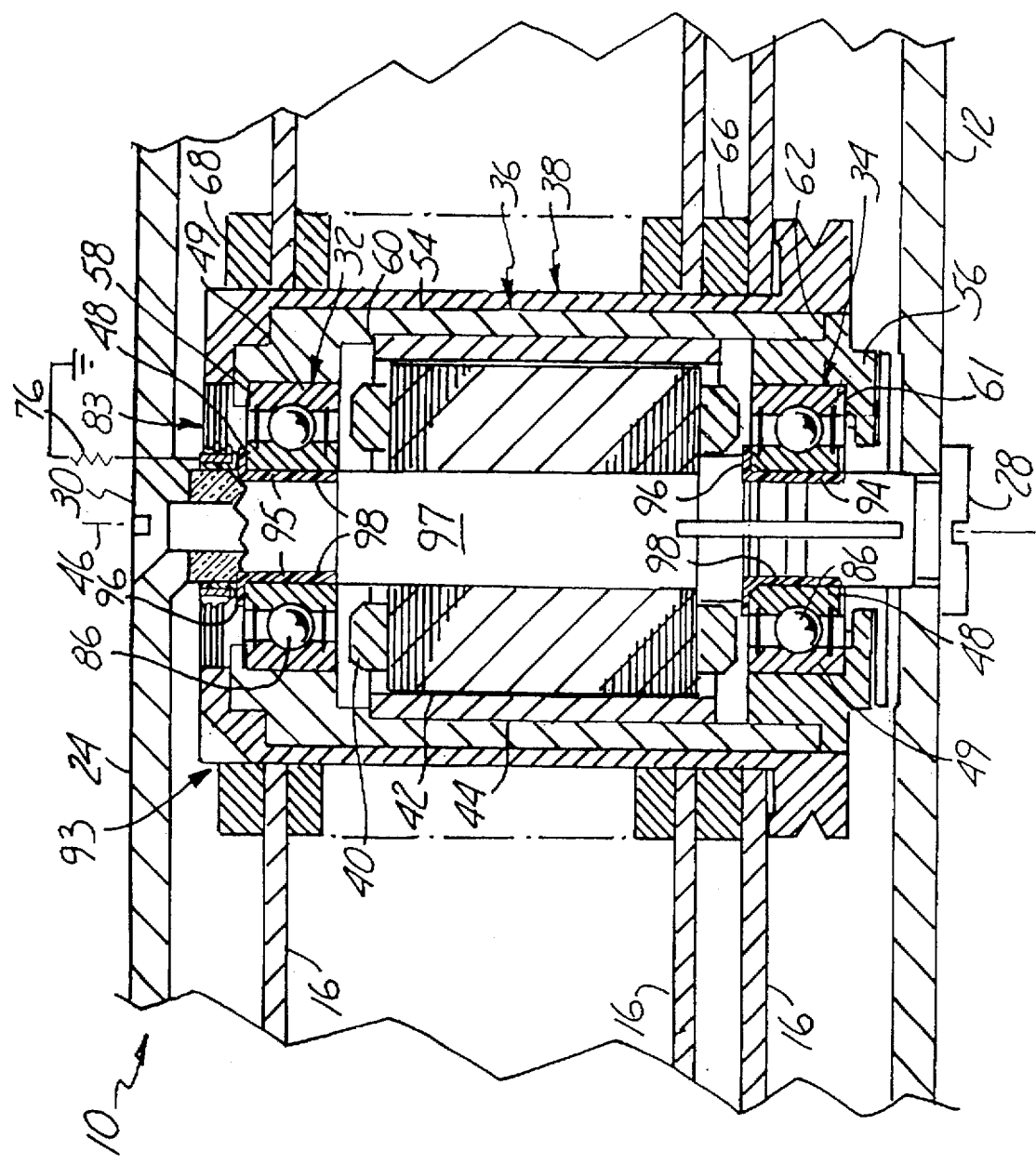
FIG. 7 is a cross-sectional view of a fourth embodiment of the spindle motor.

FIG. 7 is a cross-sectional view of an alternate embodiment 93 of spindle motor 78 shown in FIGS. 4 and 5. For sake of illustration, those elements of spindle motor 93 which are the same as corresponding elements in spindle motor 78 are numbered similarly. Spindle motor 93 is similar to spindle motor 78, except that bearing balls 82 are replaced with bearing balls 86 and shaft 80 is replaced with shaft 97. Spindle motor 93 further includes isolating inserts 94,95.

Bearing balls 86 are formed from 52100 chrome steel, as is conventionally known in the art.

Shaft 97 is similar to shaft 80 except that shaft 97 further includes grooves or slots 98. Slots 98 extend into an outer surface of shaft 97. Slots 98 accommodate inserts 94,95.

Isolating inserts 94 and 95 are generally ring-shaped and include an outward-protruding lip 96. Isolating inserts 94 and 95 preferably have a material thickness of about 0.0004 inches. Isolating inserts 94 and 95 are preferably formed from a relatively soft, impressionable and high resistivity material such as plastic. Preferably, the high resistivity material has a resistance greater than about 10 megohms.

Isolating insert 94 is positioned between inner race 48 of lower bearing unit 34 and shaft 97. Lip 96 of isolating insert 94 extends over a top surface of inner race 48 of lower bearing unit 34. Isolating insert 95 is positioned between inner race 48 of upper bearing unit 32 and shaft 97. Lip 96 of isolating insert 95 extends over a top surface of inner race 48 of upper bearing unit 32. Isolating inserts 94 and 95 are preferably press-fit around shaft 97 within slots 98. Alternatively, isolating inserts 94 and 95 may be secured to shaft 97 by adhesive such as 1838L by the 3M Company.

Isolating inserts 94 and 95 electrically isolate inner races 48 from shaft 97 and base 12. As a result, fluid seal unit 83 and isolating inserts 94 and 95 electrically isolate rotor hub 38 from shaft 97 and base 12. By electrically isolating rotor hub 38 from base 12, spindle motor 93 prevents damage to magnetoresistive heads caused by short circuiting between magnetoresistive heads and ground. Because spindle motor 93 electrically isolates rotor hub 38 from base 12, rubber feet or the like are not necessary to isolate the entire disc drive from ground. Consequently, disc drive 10 occupies less space and may be manufactured more easily.

Moreover, electrical conductor 76 of fluid seal unit 83 provides a controlled resistance to ground to control disc potential and to drain excess static charge buildtip within rotor hub 38 and memory storage discs 16. Alternatively, disc potential and excess static charge build-up may be controlled by isolating inserts 94,95 formed from a conducting plastic having a resistance greater than about 10 megohms but low enough so as to allow static discharge, such as ULTEM by G. E. Plastics with a conductive additive such as carbon. Inserts 94,95 may also be formed from polyether ether ketone (PEEK) with a conductive additive such as carbon.

5. Fifth Embodiment (FIG. 8)

Figure 8:
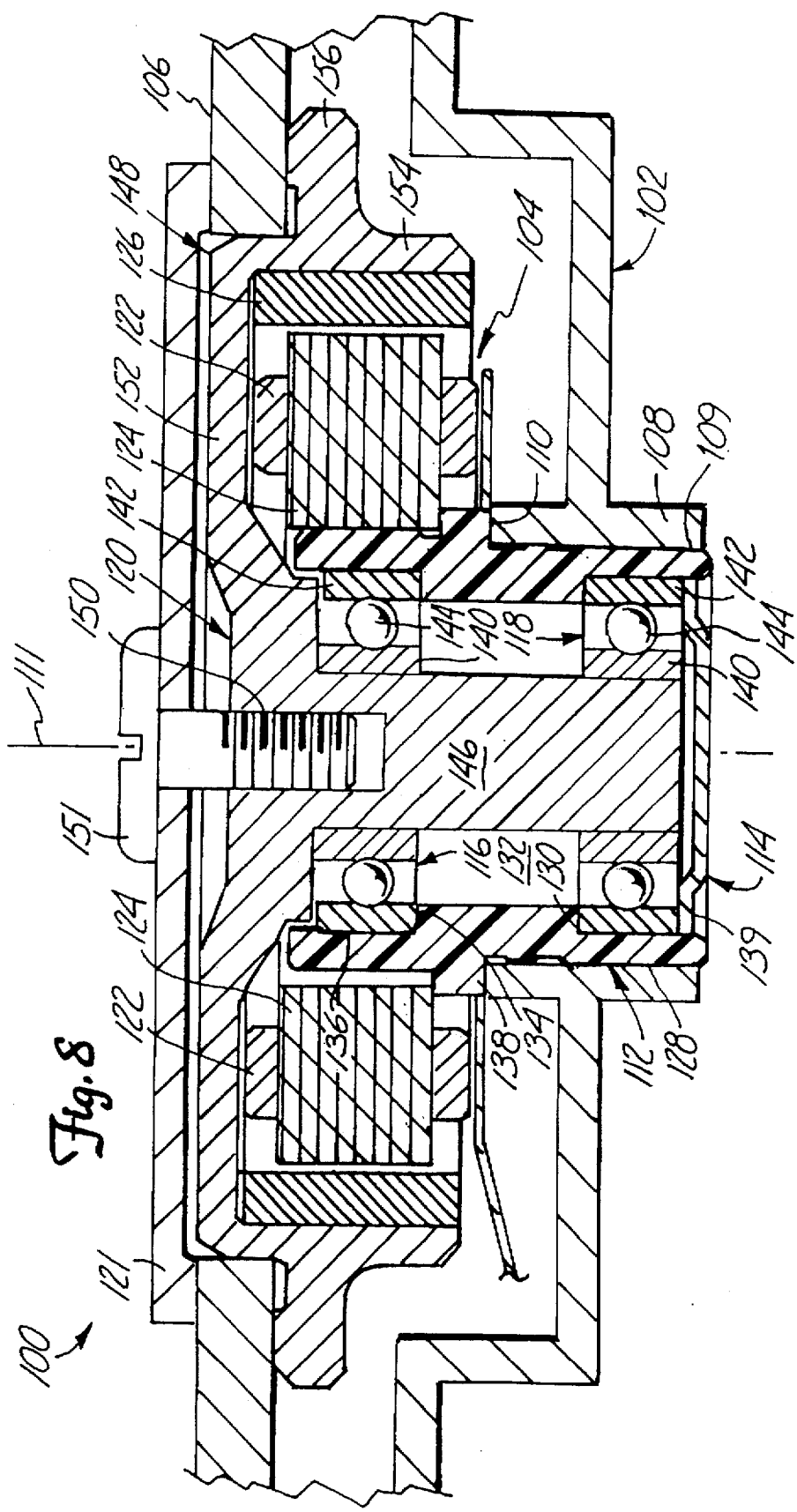
FIG. 8 is a fifth embodiment of a disc drive having a spindle motor.

FIG. 8 is a cross-sectional view of a fifth embodiment 100 of disc drive 10 taken along line 2—2 of FIG. 1. Disc drive 100 includes bottom casing or drive base 102, spindle motor 104 and memory storage disc 106.

Drive base 102 includes collar 108 and shoulder 110. Collar 108 has a cylindrical bore and is centered along axis 111. Shoulder 110 is formed at the top end of collar 108. An inner diameter of collar 108 and shoulder 110 define an interface surface 109 which contacts and couples with spindle motor 104. A portion of spindle motor 104 rests within collar 108. Spindle motor 104 is centered along axis 111. Shoulder 110 supports spindle motor 104 above base 102.

Rotating shaft spindle motor 104 includes bearing sleeve 112, contact shield 114, upper bearing unit 116, lower bearing unit 118, rotor hub 120, clamp 121, armature windings 122, armature laminations 124 and magnetic sleeve 126.

Bearing sleeve 112 is generally cylindrical and includes lower bore 128, lower shoulder 130, central bore 132, upper shoulder 134, upper bore 136 and outer sleeve flange 138. Lower bore 128 extends into bearing sleeve 112 from a bottom side of bearing sleeve 112. Towards a top end of lower bore 128, an inner side diameter of lower bore 128 narrows to form lower shoulder 130. Central bore 132 extends from lower bore 128 to upper bore 136. An inner diameter of central bore 132 widens towards a top end of central bore 132 to form upper shoulder 134 and to form upper bore 136. Outer sleeve flange 138 protrudes outward along perimeter of bearing sleeve 112. Bearing sleeve 112 is formed from a relatively soft, impressionable and high resistivity material, such as plastic. Alternatively, a high resistivity mixture or composite may be used. Preferably, the high resistivity material, mixture or composite has a resistance greater than about 10 megohms. Bearing sleeve 112 is preferably made from a plastic having a resistance greater than 10 megohms but low enough so as to allow static discharge, such as ULTEM supplied by G. E. Plastics with a conductive additive such as carbon. Alternatively, bearing sleeve 112 can be formed from polyether ether ketone (PEEK) with a conductive additive such as carbon.

Bearing sleeve 112 fits within collar 108 of base 102. Outer sleeve flange 138 rests upon shoulder 110 of base 102. Consequently bearing sleeve 112 is supported and centered along axis 111. Because bearing sleeve 112 is preferably formed from an impressionable material, bearing sleeve 112 is press fit within collar 108. By eliminating the need for adhesives to secure bearing sleeve 112 to base 102, spindle motor 104 reduces contaminants which may eventually damage the head. Alternatively, bearing sleeve 112 is secured to collar 108 of base 102 by adhesives such as 1838L by the 3M Company. Lower bearing unit 118 partially fits within lower bore 128. Upper bearing unit 136 partially fits within upper bore 136.

Bearing sleeve 112 supports upper bearing unit 116 and lower bearing unit 118 above base 102 and about axis 111. Upper bearing unit 116 is supported by upper shoulder 134 of bearing sleeve 112. Lower bearing unit 118 is partially supported by lower shoulder 130 of bearing sleeve 112. Because bearing sleeve 112 is formed from a high resistivity material having a resistance greater than about 10 megohms, bearing sleeve 112 electrically isolates bearing units 116 and 118 and rotor hub 120 from base 102. As a result, spindle motor 104 prevents damage to magnetoresistive heads caused by electrical short circuiting between magnetoresistive heads and ground. Moreover, because spindle motor electrically isolates rotor hub 120 from base 102, rubber feet are not required to electrically isolate the entire disc drive from ground. Consequently, disc drive 100 requires less space and can be more easily manufactured.

Because bearing sleeve 112 is preferably formed from a conductive plastic having a resistance greater than 10 megohms but low enough so as to allow static discharge, bearing sleeve 112 reestablishes electrical contact with rotor hub 120 and provides controlled resistance to ground to control disc potential and to drain excess static charge from rotor hub 120 and from memory storage disc 106.

Contact shield 114 is a generally saucer-shaped member having an upward extending outer edge 139. Shield 114 is made from a conductive material, such as steel. Contact shield 114 fits within lower bore 128 of bearing sleeve 112 below rotor hub 120 and lower bearing unit 118. Shield 114 is preferably secured within bearing sleeve 112 by adhesive, such as 1838L by the 3M Company. Alternatively, shield 114 may be press-fit within lower bore 128 of bearing sleeve 112 so that outer edge 139 abuts a bottom surface of lower bearing unit 118.

Contact shield 114 prevents contaminants within bearing sleeve 112 from contacting and damaging memory storage disc 106. Outer edge 139 of shield 114 is supported by lower bearing unit 118 and permits rotor hub 120 to rotate about axis 111 by preventing shield 114 from contacting rotor hub 120.

Upper bearing unit 116 and lower bearing unit 118 each include inner race 140, outer race 142, and an annular array of bearing balls 144. Inner race 140 and outer race 142 are preferably formed from 52100 chrome steel. Bearing balls 144 preferably comprise bearing bails made from 52100 chrome steel, as is known in the art. Outer race 142 of upper bearing unit 116 rests upon shoulder 134 of bearing sleeve 112. Outer race 142 of lower bearing unit 118 is positioned within lower bore 128 against shoulder 130 of bearing sleeve 112. Because bearing sleeve 112 is preferably formed from an impressionable material, outer races 142 are preferably press fit within upper and lower bores 128 and 136. By eliminating the need for adhesives to couple outer races 142 to sleeve 112, spindle motor 104 reduces potential contaminants which, upon being deposited on the disc surface, may eventually damage the head. Alternatively, outer race 142 may be secured to bearing sleeve 112 by adhesives such as 1838L supplied by the 3M Company. Inner race 140 is bonded to rotor hub 120 by adhesives. Alternatively, inner race 140 may be press fit to rotor hub 120. Annular inner race 140 cooperates with annular outer race 142 to contain the annular array of bearing balls 144 therebetween. Inner race 140 is rotatably supported relative to outer race 142 by bearing balls 144. Consequently, bearing units 116 and 118 rotatably support rotor hub 120 above base 102 and about axis 111.

Rotor hub 120 is preferably made from stainless steel and includes shaft 146 and outer support flange 148. Shaft 146 generally comprises a solid cylinder and includes threaded bore 150 at a top end of shaft 146. Shaft 146 is centered along axis 111.

Outer support flange 148 includes wings 152, rim 154 and step 156. Wings 152 extend perpendicularly away from shaft 146. Toward an outer end of wings 152, outer support flange 148 extends downward parallel to shaft 146 to form rim 154. Step 156 protrudes outwardly from rim 154 perpendicular to axis 111.

Shaft 146 carries inner race 140 of upper bearing unit 116. Toward its lower end, shaft 146 carries inner race 140 of lower bearing unit 118. Screw 151 extends through clamp 121 and threadably engages threaded bore 150 of shaft 146. Screw 151 holds clamp 121 against disc 106 to secure disc 106 between clamp 121 and step 156 of outer support flange 148. Step 156 cooperates with clamp to support disc 106 perpendicular to axis 111 above base 102. Shaft 146 centers outer support flange 148 and disc 106 about axis 111. Rim 154 of outer support flange 148 carries magnetic sleeve 126 beneath wings 152. Armature windings 122 and armature laminations 124 are positioned beneath wings 152 between bearing sleeve 112 and magnetic sleeve 126. As is generally known in the art, upon supply of electrical power to armature windings 122, and under appropriate control as is known in the art, the flux coupling between armature windings 122 and magnetic sleeve 126 results in rotational driving of rotor hub 120.

6. Sixth Embodiment (FIG. 9)

Figure 9:
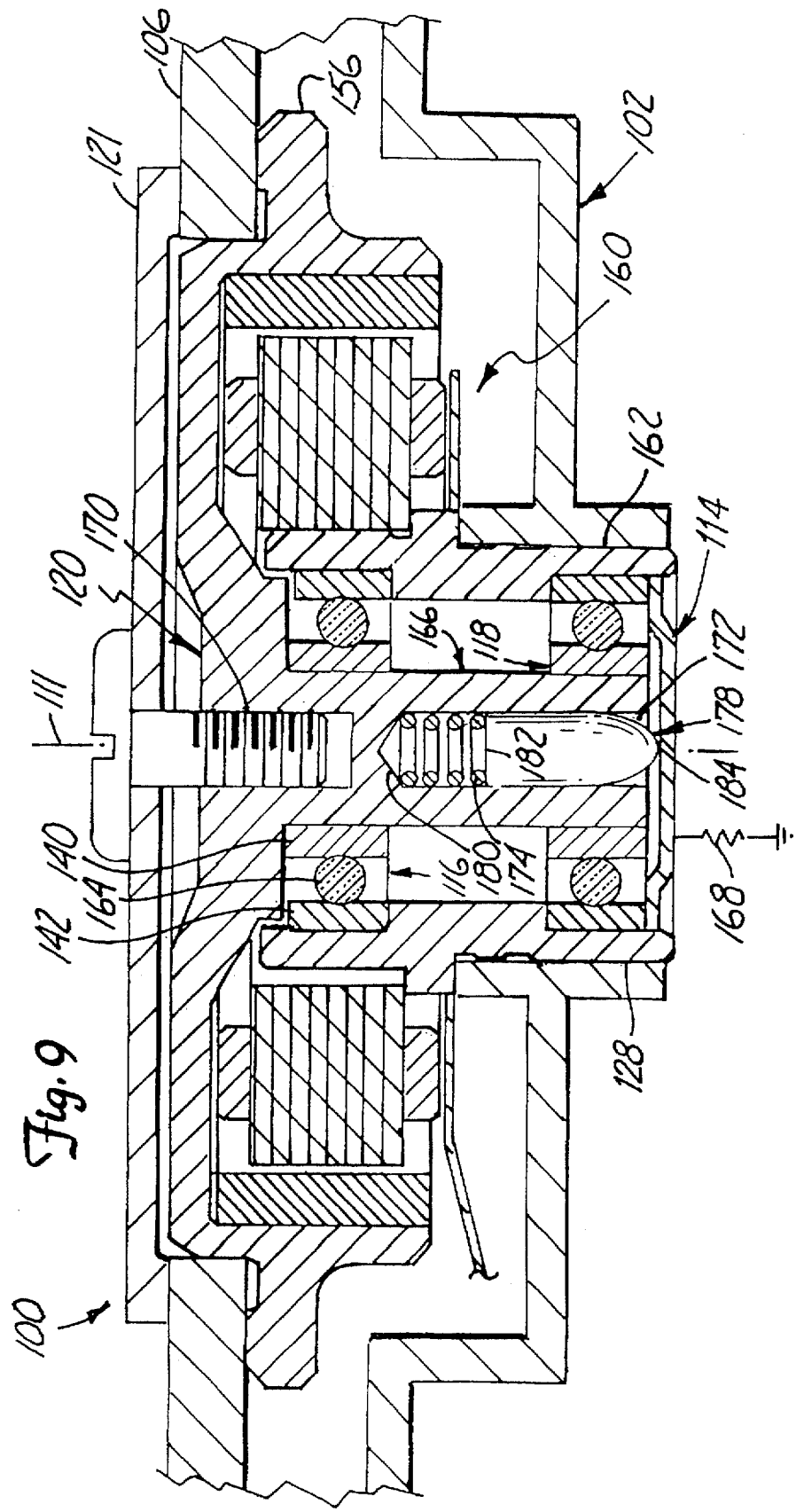
FIG. 9 is a cross-sectional view of a sixth embodiment of the spindle motor.

FIG. 9 is a cross-sectional view of an alternate embodiment 160 of spindle motor 104 shown in FIG. 8. For sake of illustration, those elements of spindle motor 160 which are the same as the corresponding elements of spindle motor 104 are numbered similarly. Spindle motor 160 is similar to spindle motor 104 except that bearing sleeve 112 of motor 104 is replaced with bearing sleeve 162, bearing balls 144 of spindle motor 104 are replaced with bearing balls 164, and that shaft 146 of spindle motor 104 is replaced with shaft 166. Spindle motor 160 further includes an electrical conductor 168 having a controlled resistance to ground.

Unlike bearing sleeve 112, bearing sleeve 162 is formed from 430F stainless steel, as is conventionally known in the art. Bearing balls 164 are formed from a high resistivity material. Alternatively, a high resistivity mixture or composite may be used. Preferably, the high resistivity material, mixture or composite has a resistance greater than about 10 megohms. Preferably, bearing balls 164 are formed from ceramic material such as silicon nitride. Alternatively, bearing balls 164 may also comprise ruby ball bearings. Inner race 140 and outer race 142 are preferably formed from 52100 chrome steel. Bearing balls 164 are compliantly fitted between inner race 140 and outer race 142 to accommodate for differences in thermal expansion between bearing balls 164 and races 140, 142. Because bearing balls 164 are formed from high resistivity materials such as ruby or ceramics, bearing balls 164 electrically isolate the hub from the base. In addition, the adhesives used to secure contact shield 114 within bearing sleeve 162 electrically insulate contact shield 114 from outer race 142 and bearing sleeve 162. Thus, spindle motor 160 of disc drive 100 electrically isolates rotor hub 120 from base 102. Spindle motor 160 prevents damage to magnetoresistive heads caused by short circuiting between the magnetoresistive heads and ground. Because spindle motor 160 of disc drive 100 electrically isolates rotor hub 120 from base 102, disc drive 100 does not require rubber feet or an isolation film to electrically isolate the entire disc drive from ground. Disc drive 100 occupies less space and may be more easily manufactured.

In addition, bearing balls 164 provide several other advantages not limited to disc drives having magnetoresistive heads. Bearing balls 164 formed from ruby and ceramic material such as silicon nitride result in improvements in ball bearing axial and radial stiffness and ultimately motor axial and rocking frequencies. Moreover, bearing balls 164 formed from a ruby or a ceramic material such as silicon nitride have improved ball surface finish and sphericity. Consequently, ball bearing balls 164 formed from ruby or ceramics improve acoustics and non-repetitive runout.

Because bearing balls 164 are formed from ruby or ceramic material, bearing balls 164 are smoother and have a lower coefficient of friction. As a result, bearing units 116 and 118 require little or no grease. By reducing the amount of grease within bearing units 116 and 118, friction torque is largely reduced. Consequently, less motor running power is needed to overcome friction torque. In addition, lowering the amount of grease required by bearing units 116 and 118 also lowers the possibility of disc contamination caused by grease. Furthermore, because bearing balls 164 made of ruby or ceramics have a higher modulus of elasticity, less surface area of members 164 is in contact with inner race 140 and outer race 142. As a result, bearing balls 164 do not wear as quickly and have a longer useful life.

Shaft 166 of spindle motor 160 includes threaded bore 170, housing bore 172, spring 174 and contact pin 178.

Threaded bore 170 extends downward into a top end of shaft 166. Threaded bore 170 engages screw 150 to press clamp 121 against disc 106 to hold disc 106 perpendicular to axis 111 between step 156 of rotor hub 120 and clamp 121.

Housing bore 172 extends from a bottom end of shaft 166 into shaft 166. At its top end, housing bore 172 terminates to form shoulders 180. Spring 174 fits within housing bore 172 near the top end of housing bore 172. Spring 174 preferably comprises a compression spring.

Contact pin 178 includes a generally flat face 182 and contact area 184. Face 182 is a generally flat surface at the first end of contact pin 178. Contact area 184 is located at a second end of contact pin 178. Contact pin 178 is preferably made from brass. Face 182 of contact pin 178 is received within housing bore 172 and is in contact with spring 174. Because contact pin 178 and spring 174 are substantially received within housing bore 172 and because shield 114 is mounted within lower bore 128, disc drive 100 occupies less space.

Spring 174 bears against shoulder 180 and face 182 of contact pin 178 to urge contact area 184 of contact pin 178 against shield 114. Contact area 184 preferably contacts shield 114 along the centerline of shaft 166, axis 111. As a result, a controlled resistance electrical pathway is established between shaft 166 of rotor hub 120 through contact pin 178 and shield 114 to electrical conductor 168 which is connected to ground. Because a controlled resistance electrical pathway is re-established between rotor hub 120 and ground, spindle motor 160 controls disc potential and drains excess static charge buildup within rotor hub 120 and memory storage disc 106. At the same time, spindle motor 160 also electrically isolates rotor hub 120 from ground to prevent damage to magnetoresistive heads caused by short circuiting between magnetoresistive heads and ground.

Alternatively, contact pin 178 is made from a conducting plastic having a predetermined, known resistance such as Rulon ECW. With this alternative, electrical conductor 168 merely completes the electrical pathway from shield 114 to ground. As a result, the resistance of contact pin 178, rather than the resistance of electric conductor 168, is selected to control disc potential and to drain excess static charge buildup within rotor hub 120 in memory storage disc 106. In addition, because the resistance of contact pin 178 preferably is greater than 10 megohms, spindle motor 160 also electrically isolates rotor hub 120 from ground to prevent short circuiting between magnetoresistive heads and ground.

7. Seventh Embodiment (FIG. 10)

Figure 10:
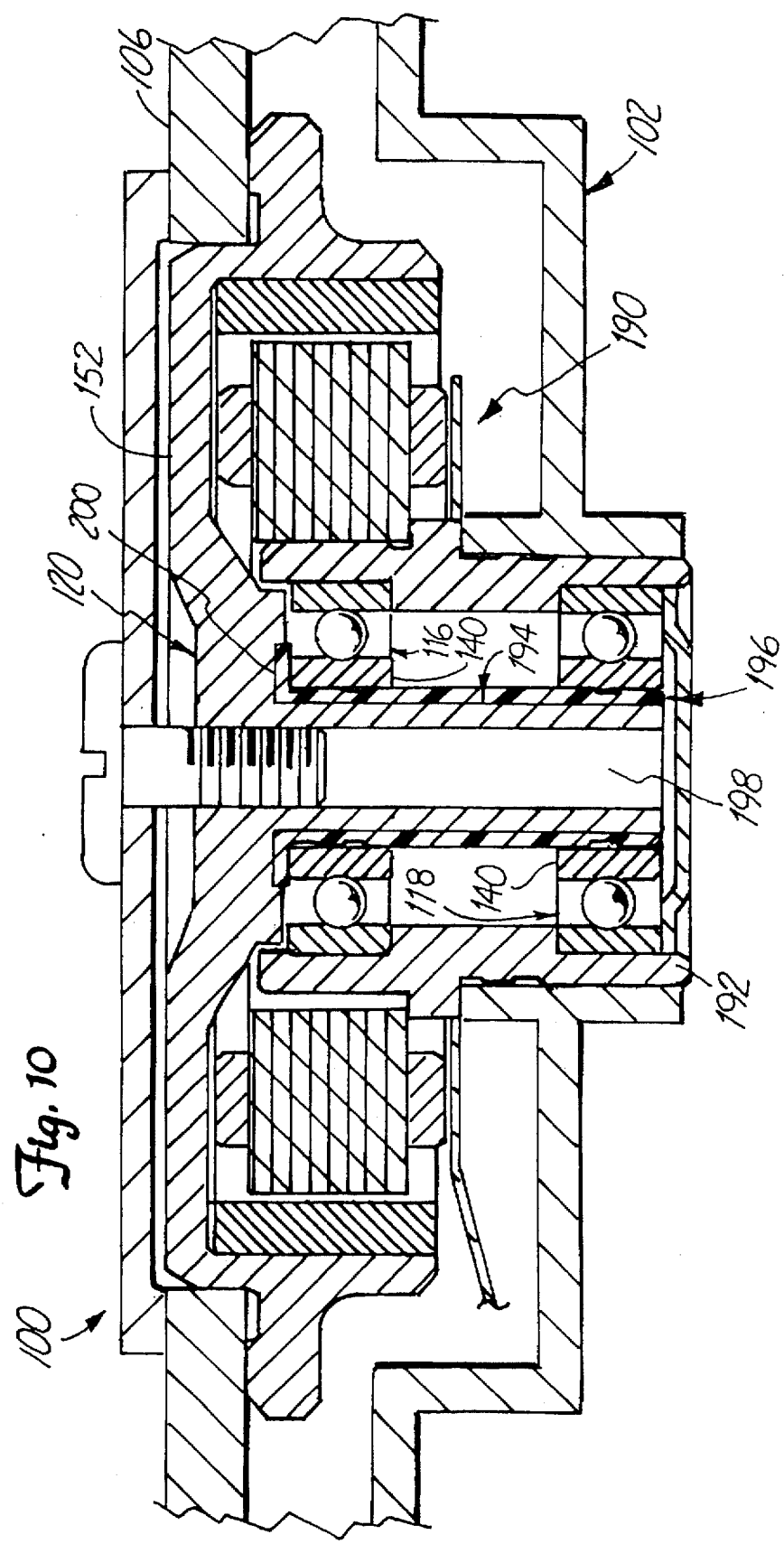
FIG. 10 is a cross-sectional view of a seventh embodiment of the spindle motor.

FIG. 10 is a cross-sectional view of an alternate embodiment 190 of spindle motor 104 shown in FIG. 8. For sake of illustration, those elements of spindle motor 190 which are the same as the corresponding elements of spindle motor 104 are numbered similarly. Spindle motor 190 is similar to spindle motor 104, except that bearing sleeve 112 of spindle motor 104 is replaced with bearing sleeve 192 and that shaft 146 of spindle motor 104 is replaced with shaft 194. Spindle motor 190 further includes high resistivity insert 196. Unlike bearing sleeve 112 of spindle motor 104, bearing sleeve 192 of spindle motor 210 is formed from 430F steel, as is conventionally known in the art.

Unlike shaft 146 of spindle motor 104, shaft 194 includes threaded bore 198. Threaded bore 198 of spindle motor 190 extends completely through shaft 194 to a bottom end of shaft 194. Bore 198 has an inner diameter less than an outer diameter of shaft 194.

Insert 196 is ring-shaped and includes an outwardly extending lip 200. Insert 196 is formed from a high resistivity material such as plastic. Alternatively, a high resistivity mixture or composite of materials may be used. Preferably, the high resistivity material, mixture or composite has a resistance greater than about 10 megohms. Preferably, insert 196 is formed from a high resistance, partially conducting, impressionable plastic having a resistance greater than 10 megohms but low enough so as to allow static discharge, such as ULTEM by G. E. Plastics with a conductive additive such as carbon. Alternatively, polyether ether ketone (PEEK) may be used with a conductive additive such as carbon.

Insert 196 is positioned between shah 194 and inner race 140 of bearing units 116 and 118. Lip 200 of insert 196 extends between wings 152 of rotor hub 120 and inner race 140 of upper bearing unit 116. Insert 196 is preferably press fit around shah 194. Alternatively, insert 196 may be secured to shaft 194 by adhesive, such as 1838L by the 3M Company.

Because insert 196 has a resistance greater than about 10 megohms, insert 196 electrically isolates inner race 140 from rotor hub 120. As a result, insert 196 also electrically isolates rotor hub 120 from base 102. By electrically isolating rotor hub 120 from base 102, spindle motor 190 prevents damage to magnetoresistive heads caused by short circuiting between magnetoresistive heads and ground. Because spindle motor 190 electrically isolates rotor hub 120 from base 102, rubber feet or the like are not necessary to isolate the entire disc drive from ground. Consequently, disc drive 100 occupies less space and may be manufactured more easily.

Moreover, because insert 196 is preferably made from a conducting plastic, insert 196 also reestablishes electrical contact with rotor hub 120 and provides a controlled resistance to ground to control disc potential and to drain excess static charge buildup within rotor hub 120 and memory storage disc 106.

8. Eighth Embodiment (FIG. 11)

Figure 11:
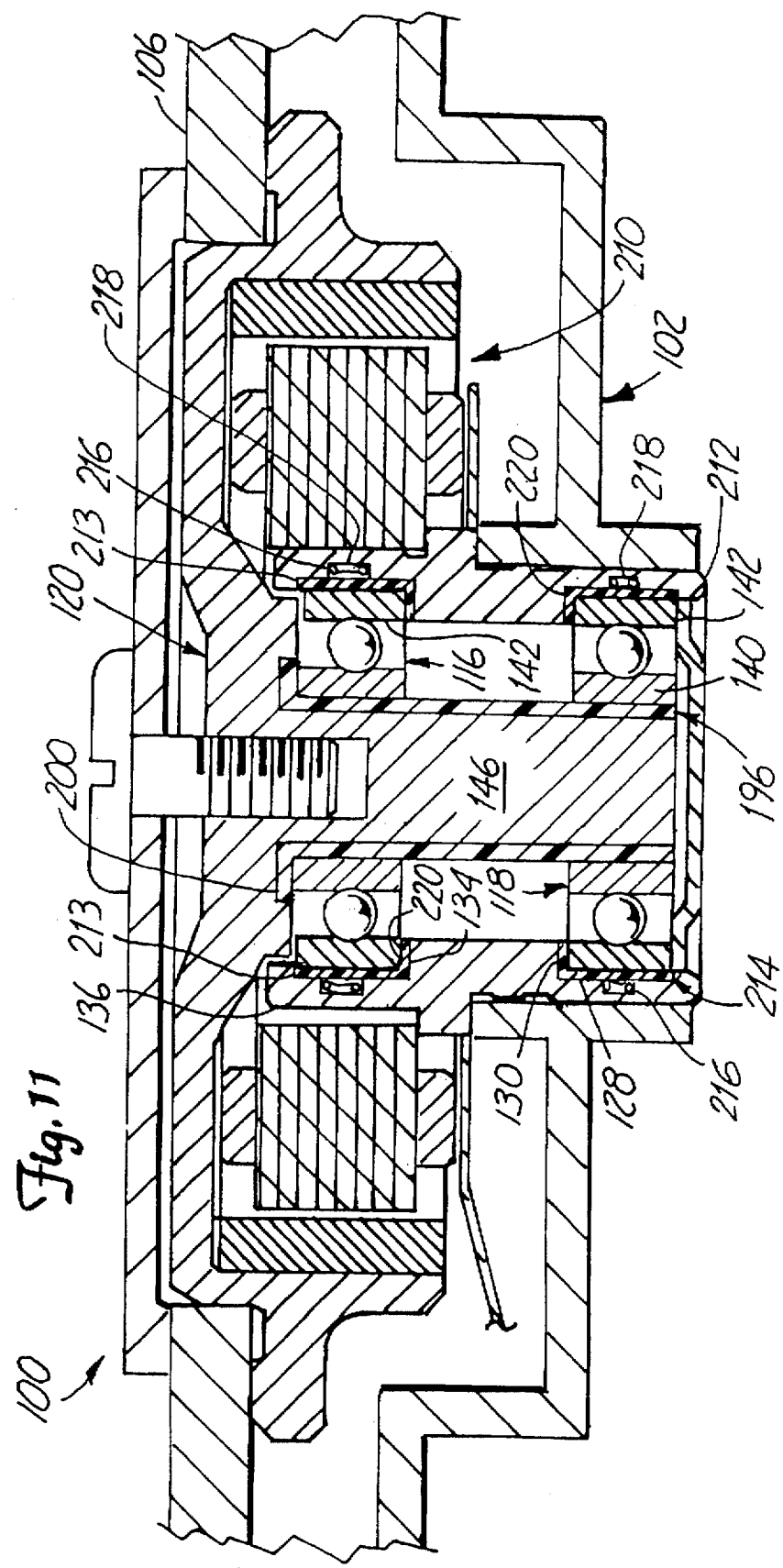
FIG. 11 is a cross-sectional view of an eighth embodiment of the spindle motor.

FIG. 11 is a cross-sectional view of an alternate embodiment 210 of spindle motor 104 shown in FIG. 8. For sake of illustration, those elements of spindle motor 210 which are the same as elements of spindle motor 104 are numbered similarly. Spindle motor 210 is similar to spindle motor 104, except that bearing sleeve 112 of spindle motor 104 is replaced with bearing sleeve 212. Spindle motor 210 further includes insert 196, isolating inserts 213,214 and canted springs 216. Unlike bearing sleeve 112 of spindle motor 104, bearing sleeve 212 is formed from 430F steel, as is conventionally known in the art. In addition, bearing sleeve 212 further includes annular grooves 218. Annular grooves 218 extend into bearing sleeve 212 along the inner diameter of upper bore 136 and lower bore 128. Canted springs 216 fit within annular grooves 218.

Inserts 213,214 are ting-shaped and each includes an inward extending lip 220. Isolating inserts 213,214 preferably have a material thickness of about 0.004 inches. Isolating inserts 213,214 are formed from high resistivity material, mixture, or composite. Preferably, the high resistivity material, mixture or composite is relatively impressionable and has a resistance greater than about 10 megohms. Inserts 213,214 are preferably formed from a conductive plastic having a resistance greater than 10 megohms but low enough so as to allow static discharge, such as ULTEM by G. E. Plastics with a conductive additive such as carbon. Alternatively, inserts 213,214 may be formed from polyether ether ketone (PEEK) with a conductive additive such as carbon.

Insert 213 is inserted within upper bore 136 between bearing sleeve 2 12 and outer race 142 of bearing unit 116. Insert 214 is inserted within lower bore 128 between bearing sleeve 212 and outer race 142 of bearing unit 118. Lip 220 of insert 214 abuts shoulder 130 of bearing sleeve 212. Lip 220 of insert 213 abuts shoulder 134 of bearing sleeve 212. Inserts 213 and 214 are preferably press fit within upper bore 136 and lower bore 128, respectively. Alternatively, inserts 213 and 214 may be attached to bearing sleeve 212 by adhesive, such as 1838L by the 3M Company. Because inserts 213,214 are formed from high resistivity material, inserts electrically isolate rotor hub 120 from base 102. Because inserts 213 and 214 electrically isolate rotor hub 120 from base 102, spindle motor 210 prevents damage to magnetoresistive heads caused by electrical short circuiting between magnetoresistive heads and ground. Moreover, because spindle motor 210 electrically isolates rotor hub 120 from base 102, rubber feet are not required to isolate the entire disc drive from ground.

Inserts 196, 213 and 214 made from a conducting plastic such as Ultem by G. E. Plastics with a conductive additive such as carbon additionally reestablish electrical contact with rotor hub 120 and provide a controlled resistance to ground to control disc potential and to drain excess static charge buildup within rotor hub 120 and memory storage disc 106.

In addition, inserts 196, 213 and 214 permit each inner race 140 and each outer race 142 to be coupled to shaft 146 and bearing sleeve 212, respectively, without adhesive. Because inserts 196, 213 and 214 are preferably formed from the relatively soft, impressionable material, such as ULTEM by G. E. Plastics, insert 196 is press fit to shaft 146, inner race 140 is press fit to insert 196, inserts 213,214 are press fit to bearing sleeve 212 and each outer race 142 is press fit to inserts 213,214 without any adhesive. Because bearing units 116 and 118 are coupled between shaft 146 and bearing sleeve 212 without adhesive, contaminants from adhesive vapors are not deposited upon memory storage disc 106. As a result, the magnetic head is less likely to be damaged by contaminants as it flies above the surface of memory storage disc 106.

Inserts 196, 213 and 214 also act as a noise insulating barrier to reduce the decibel level or amount of noise that is produced by spindle motor 210. Consequently, disc drive 100 operates more quietly.

Annular grooves 218 house canted springs 216. Canted springs 216 maintain positive pressure on inserts 213,214. As a result, mechanical stability problems such as creep are prevented.

9. Ninth Embodiment (FIG. 12)

Figure 12:
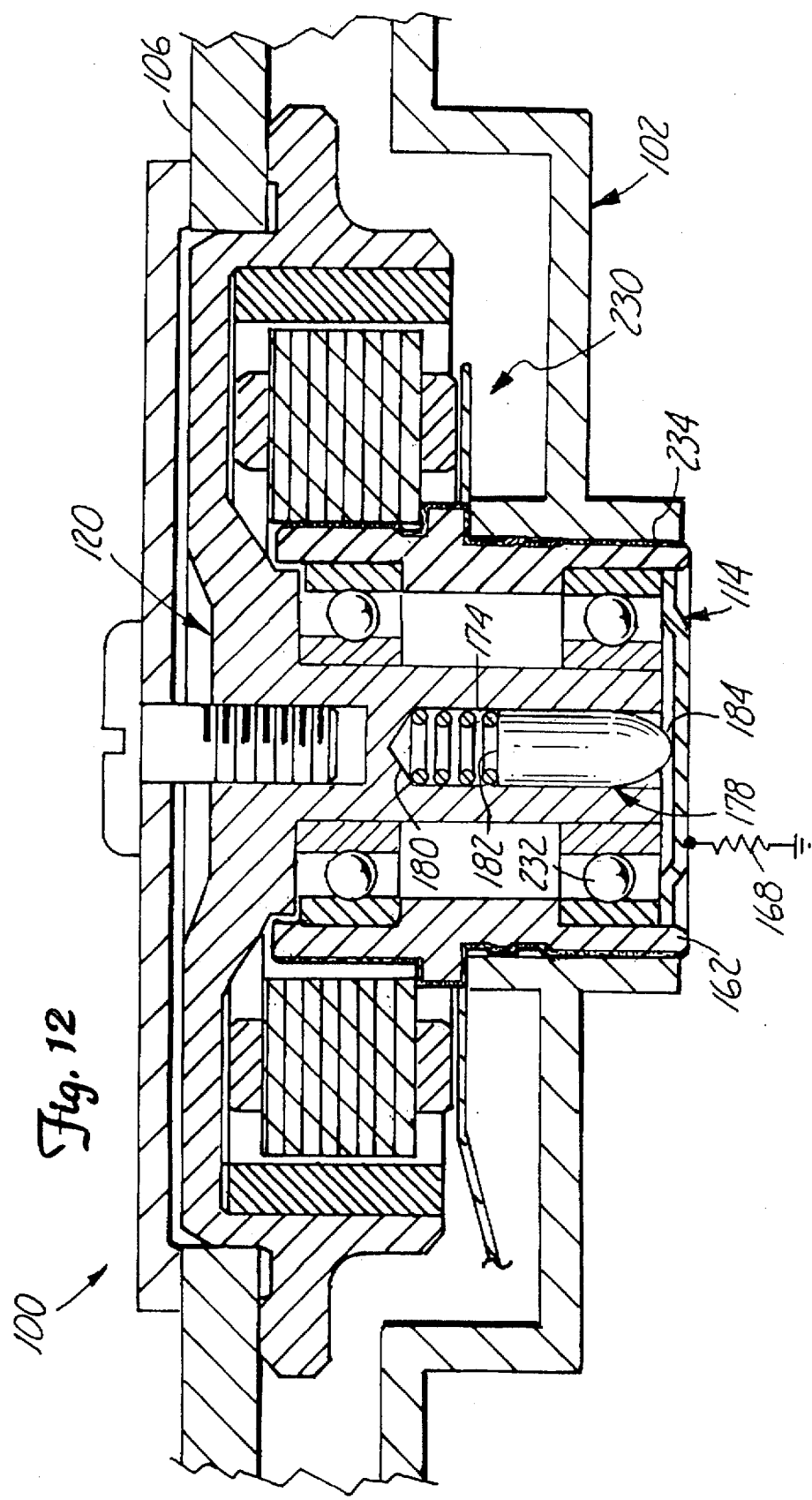
FIG. 12 is a cross-sectional view of a ninth embodiment of the spindle motor.

FIG. 12 is cross-sectional view of an alternate embodiment 230 of spindle motor 160 shown in FIG. 9. For sake of illustration, those elements of spindle motor 230 which are the same as the corresponding elements of spindle motor 160 are numbered similarly. Spindle motor 230 is similar to spindle motor 160 except that bearing balls 164 of spindle motor 160 are replaced with bearing balls 232. Spindle motor 230 further includes isolation coating 234. Unlike bearing balls 164 of spindle motor 160, bearing bails 232 of spindle motor 230 are made from 52100 chrome steel, as is conventionally known in the art.

Isolation coating 234 comprises a coating of high resistivity material applied to an outer surface of bearing sleeve 162. Preferably, isolation coating 234 comprises an electrically deposited epoxy. Isolating coating 234 has a thickness of at least about 5 microns. Preferably, isolation coating 234 has a thickness from about 20 microns to about 30 microns. Isolation coating 234 coats an entire outer surface of bearing sleeve 162. Because isolation coating 234 is thick enough to electrically isolate bearing sleeve 162 from base 102, rotor hub 120 is electrically isolated from base 102. As a result, spindle motor 230 prevents damage to magnetoresistive heads caused by short circuiting between magnetoresistive heads and ground. Because spindle motor 230 electrically isolates rotor hub 120 from base 102, no rubber feet are required to electrically isolate the entire disc drive 100 from ground. Consequently, disc drive 100 requires less space and may be more easily manufactured.

In addition, spring 174 bears against shoulder 180 and face 182 of contact pin 178 to urge contact area 184 of contact pin 178 against shield 114. As a result, a controlled resistance electrical pathway is established between shaft 166 of rotor hub 120 through contact pin 178 and shield 114 to electrical conductor 168, which is connected to ground. Because a controlled resistance electrical pathway is re-established between rotor hub 120 and ground, spindle motor 230 controls disc potential and drains excess static charge buildup within rotor hub 120 and memory storage disc 106.

10. Tenth Embodiment (FIG. 13)

Figure 13:
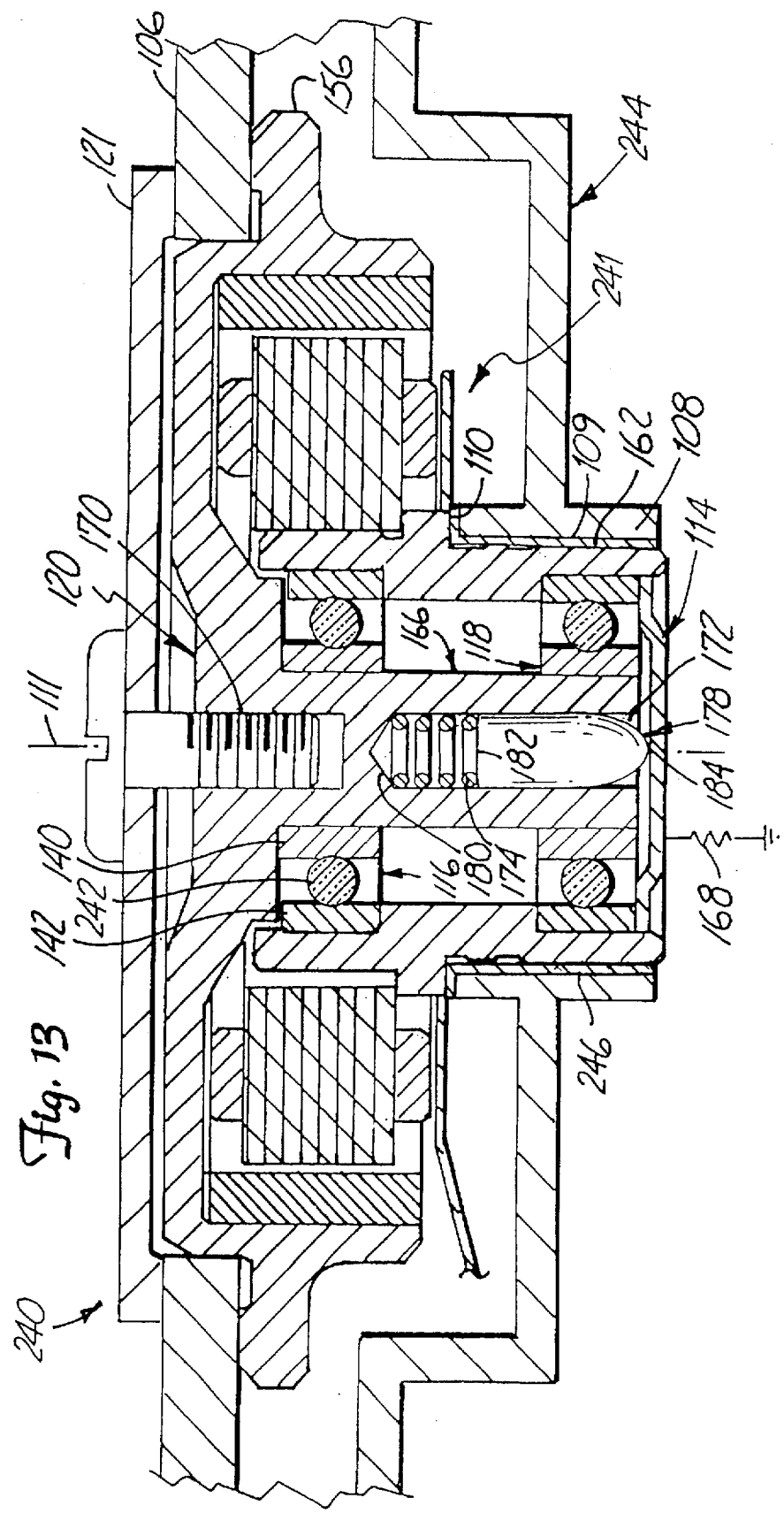
FIG. 13 is a cross-sectional view of a tenth embodiment of the disc drive and spindle motor of FIG. 8.

FIG. 13 is a cross-sectional view of a tenth embodiment 240 of disc drive 100 shown in FIG. 9. Disc drive 240 is similar to disc drive 100 shown in FIG. 9 except that spindle motor 160 is replaced with spindle motor 241, and that drive base 102 is replaced with drive base 244. For sake of illustration, those elements of spindle motor 241 which are the same as the corresponding elements of spindle motor 160 are numbered similarly. Spindle motor 241 is similar to spindle motor 160 except that bearing balls 164 of spindle motor 160 are replaced with bearing balls 242. Unlike bearing balls 164 of spindle motor 160, bearing balls 242 of spindle motor 241 are made from 52 100 chrome steel as is conventionally known in the art.

Drive base 244 is similar to drive base 102 except that drive base 244 further includes isolation layer 246. Isolation layer 246 is formed from a high resistivity material. Isolation layer 246 is formed on or applied to interface surface 109 so as to electrically isolate spindle motor 241 from base 244. Alternatively, isolation layer 246 may be formed on or applied to an entire surface of base 244 for ease of manufacture. Isolation coating 246 preferably comprises a hard anodized metallic layer. Alternatively, isolation 246 consists of an epoxy coating applied to base 244.

Isolation coating 246 electrically isolates spindle motor 241 from base 244. As a result, drive base 244 of disc drive 240 prevents damage to magnetoresistive heads caused by short circuiting between magnetoresistive heads and ground. At the same time, isolation coating 246 eliminates the need for rubber feet or grommets. Thus, disc drive 240 is easier to manufacture and requires less space.

11. Eleventh Embodiment (FIG. 14)

Figure 14:
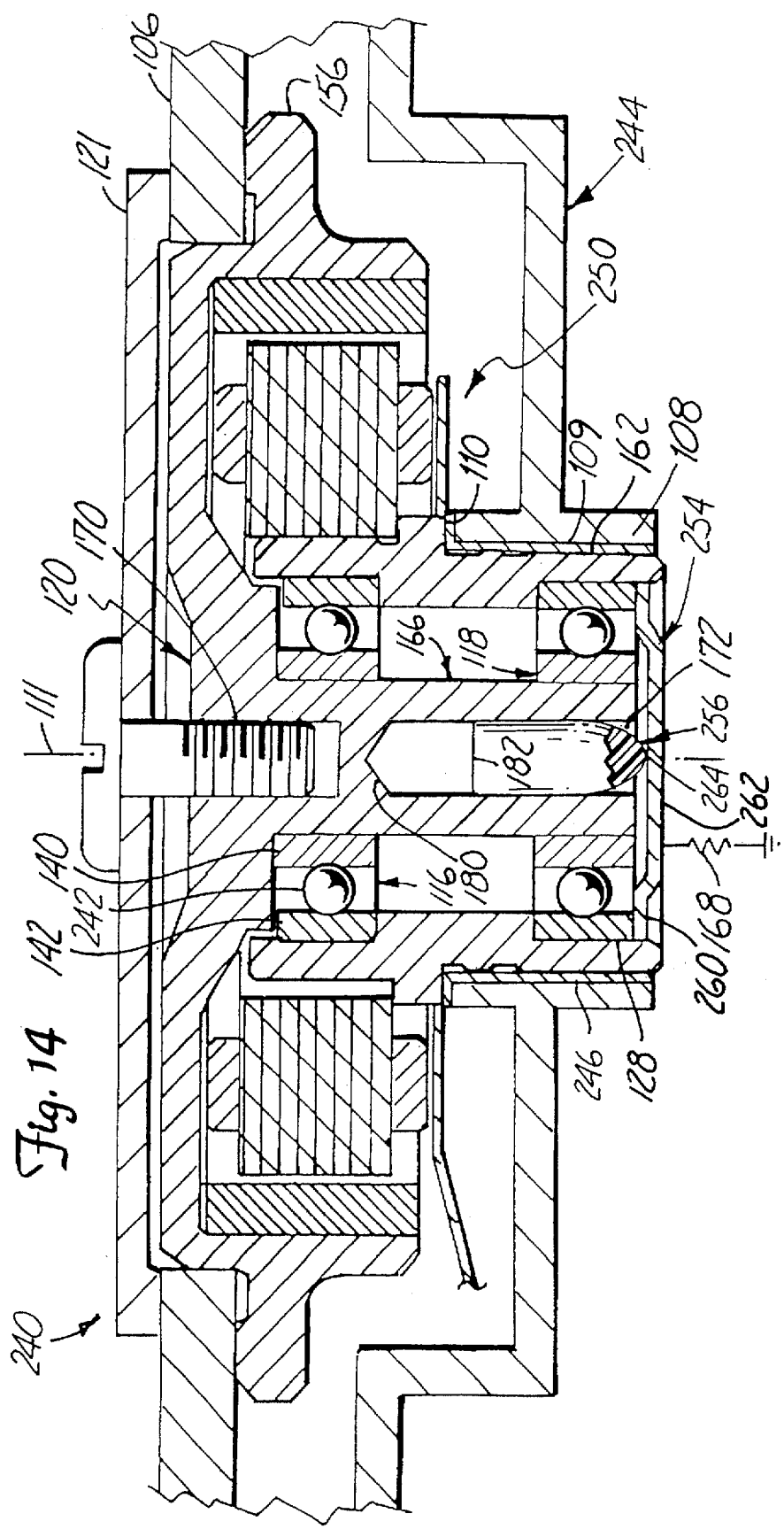
FIG. 14 is a cross-sectional view of an eleventh embodiment of the spindle motor of FIG. 13.

FIG. 14 is a cross sectional view of an alternate embodiment 250 of spindle motor 160 shown in FIG. 9. For the sake of illustration, those elements of spindle motor 250 which are the same as the corresponding elements of spindle motor 160 are numbered similarly. Spindle motor 250 is similar to spindle motor 160 except that spring 174 and contact shield 114 of spindle motor 160 are replaced with contact shield 254 and that contact pin 178 is replaced with contact button or pin 256.

Contact shield 254 is a generally saucer-shaped member having an upward extending outer edge 260 and a spring-biased central portion 262. Shield 254 is made from a conductive material, such as steel. Contact shield 254 fits within lower bore 128 of bearing sleeve 162 below rotor hub 120 and lower bearing unit 118. As a result, disc drive 100 has a lower height and requires less space. Shield 254 is preferably secured within bearing sleeve 162 by adhesive, such as 1838L by the 3M Company. Alternatively, shield 254 may be press fit within lower bore 128 of bearing sleeve 162 so that outer edge 260 abuts the bottom surface of lower bearing unit 118.

Central portion 262 is spring biased so as to contact or abut contact pin 256. Central portion preferably contacts contact pin 256 along the centerline of shaft 166, axis 111. Because central portion 262 is spring biased, central portion 262 remains in at least intermittent contact with contact pin 256 during vibration of rotor hub 120 and contact pin 256. At the same time, however, central portion 262 does not prevent or substantially interfere with the rotation of contact pin 256, shaft 166 or rotor hub 120.

Contact shield 254 prevents contaminants within bearing sleeve 162 from contacting and damaging memory storage disc 106. Outer edge 260 of shield 254 is supported by lower bearing unit 118 and permits rotor hub 120 to rotate about axis 111 by preventing shield 254 from contacting rotor hub 120. Central portion 262 electrically connects shaft 166 and shield 254 while permitting shaft 166 to rotate above shield 254.

Contact pin 256 is similar to contact pin 178 of spindle motor 160 except that contact pin 256 has a contact portion or area 264 made from a conducting carbon filled plastic such as Rulon ECW supplied by Dixon Industries. Alternatively, pin 256 may be entirely made from a conducting carbon filled plastic. Contact pin 256 has an outer diameter substantially equal to the inner diameter of housing bore 172 so that contact pin 256 may be press fit within housing bore 172. Contact pin 256 is electrically connected to shaft 166. Consequently, contact pin 256 is fixedly secured within housing bore 172 so that contact area 264 protrudes out of housing bore 172 and is in abutting contact with central portion 262 of contact shield 254. Because contact area 264 of contact pin 256 is held in a fixed position beyond housing bore 172 and because central portion 262 of contact shield 254 is spring biased into contact with and against contact area 264, contact area 264 contacts shield 254 to provide an electrical pathway between contact pin 256 and contact shield 254. As a result, contact pin 256, which is made of the conducting plastic having a known and controllable resistance, provides a controlled resistance electrical pathway from rotor hub 120 through shaft 166, contact pin 256 and contact shield 260 to ground through conductor 168. Contact pin 256 has a resistance greater than 10 megohms but low enough so as to allow static discharge. Contact pin 256 re-establishes electrical contact with rotor hub 120 to control disc potential and to drain excess static charge from rotor hub 120 and from memory storage disc 106.

Because contact pin 256 is formed from a conducting or conductive plastic, contact pin 256 provides lubricity and a controlled resistance within the same structural element. In addition, drag upon rotor hub 120 is minimized, space is conserved, and spindle motor 250 remains a self-contained sub-assembly.

12. Twelfth Embodiment (FIGS. 15 and 16)

Figure 15:
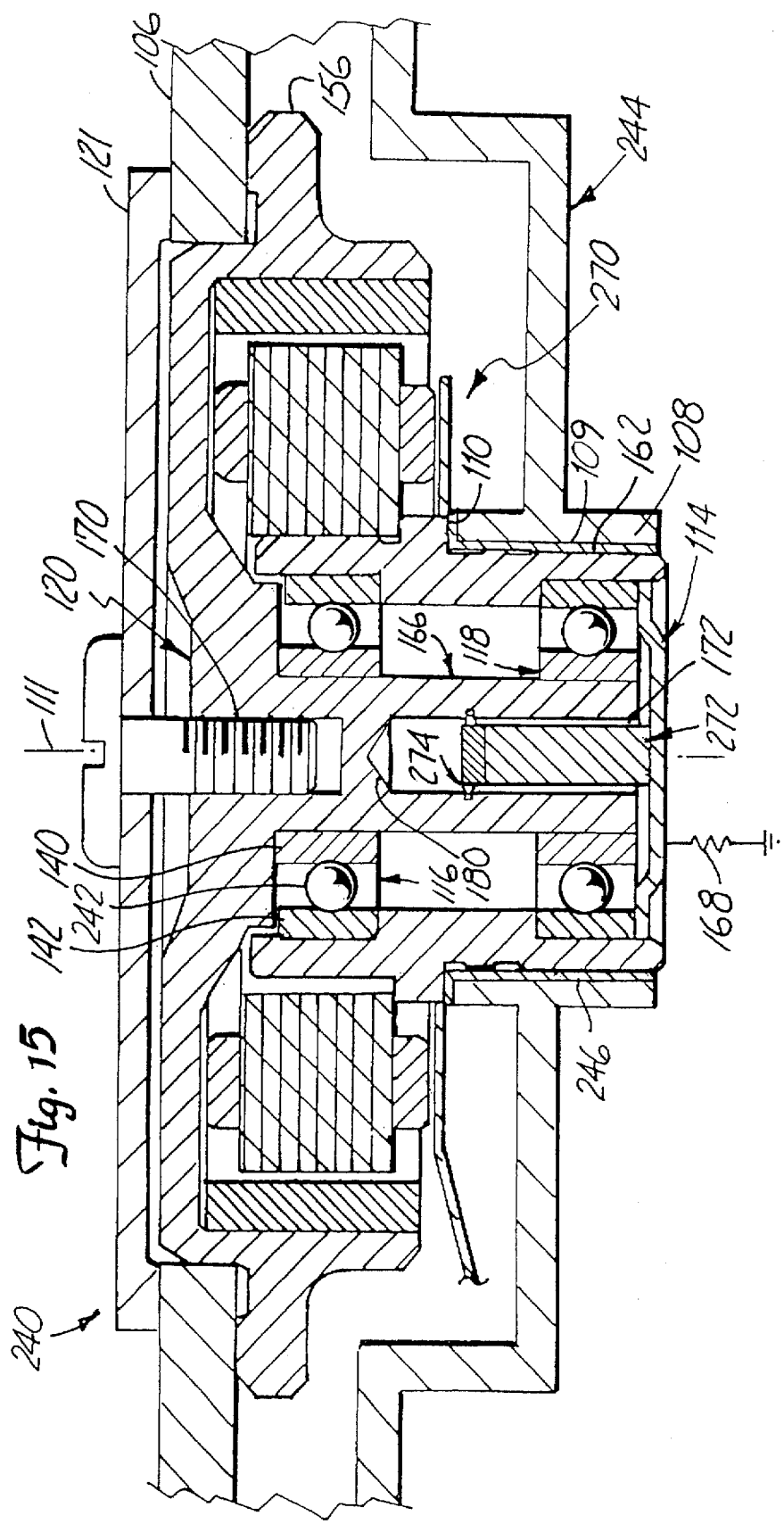
FIG. 15 is a cross-sectional view of a twelfth embodiment of the disc drive and spindle motor of FIG. 13.

FIG. 15 is a cross sectional view of an alternate embodiment 270 of disc drive 241 shown in FIG. 13. Disc drive 270 is similar to spindle motor 241 except that spring 174 and contact pin 178 of spindle motor 241 are replaced with conducting rod 272 and ferro-fluid connecting unit 274. For sake of illustration, those elements of spindle motor 270 which are the same as the corresponding elements of spindle motor 241 are numbered similarly. Conducting rod 272 consists of an elongated rod formed from conducting material and having an outer diameter smaller than the inner diameter of housing bore 172 of shaft 166.

Conducting rod 272 extends upward from contact shield 114 into housing bore 172. As a result, conducting rod 272 does not add additional height to disc drive 240. Conducting rod 272 is preferably integrally formed with contact shield 114. Alternatively, conducting rod 172 may be fixedly secured to contact shield 272.

Figure 16:
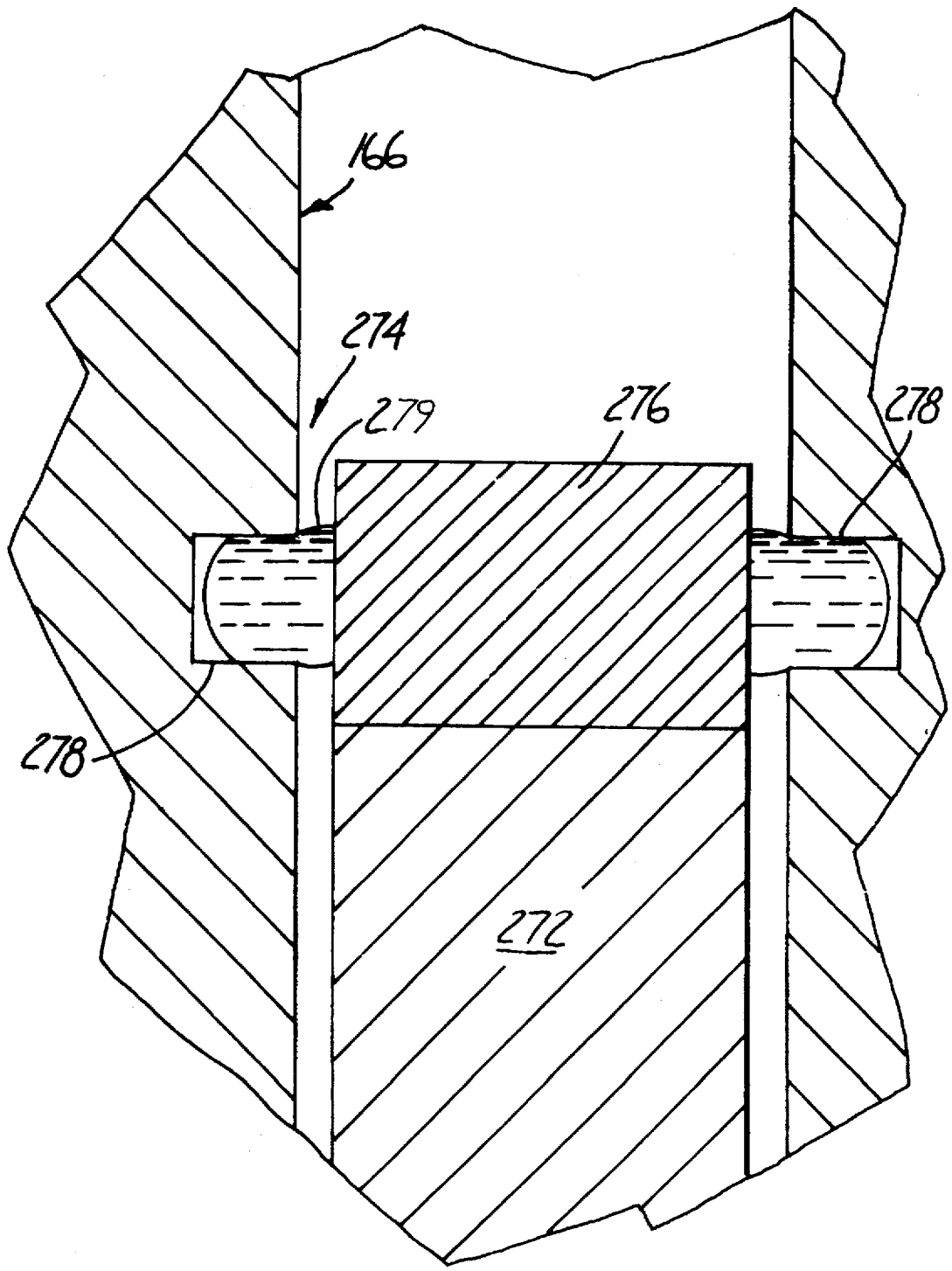
FIG. 16 is an enlarged fragmentary cross-sectional view of a fluid connecting unit of the spindle motor of FIG. 13.

As best shown by FIG. 16, ferro-fluid connecting unit 274 interfaces between shaft 166 and conducting rod 272. Fluid connecting unit 274 includes magnetic cap or ring 276, seal groove or ring 278 and ferro-fluid 279. Magnetic ring 276 is secured to a top portion of conducting rod 272. Alternatively, magnetic ring 276 of fluid connecting unit 274 may be replaced with a conducting rod similar to conducting rod 272 having a magnetized portion in running alignment with seal ring 278. Seal ring 278 is a groove defined by magnetic material such as steel or iron and which extends into shaft 166 along an inner surface of housing bore 172 and defines a radially inwardly presented exclusion fluid seal face in running engagement with magnetic ring 276. Because magnetic ring 276 and seal ring 278 are formed as integral parts of rod 272 and shaft 166, respectively, ferro-fluid connecting unit 274 requires little space, enabling unit 274 to fit within housing bore 172.

Ferro-fluid 279 is suspended between magnetic ring 276 and seal ring 278. Ferro-fluid 279 interfaces between shaft 166 and conducting rod 272 to electrically connect shaft 166 to conducting rod 272 while permitting shaft 166 to rotate about conducting rod 272 with minimal frictional drag upon shaft 166. As a result, fluid connecting unit 274 provides a controlled resistance electrical pathway from shaft 166 through fluid connecting unit 274, conducting rod 272, contact shield 114 and electrical conductor 168 to ground. The resistance of electrical conductor 168 is selected to preferably have a resistance greater than 10 megohms but low enough so as to allow static discharge. Consequently, spindle motor 270 prevents damage to magnetoresistive heads caused by static charge buildup.

Alternatively, as can be appreciated, rod 272 and ferro-fluid connecting unit 274 may also be used in place of spring 174 and contact pin 178 of spindle motor 160 shown in FIG. 9. In addition, rod 272 may also be made from a carbon filled conducting plastic such as Rulon ECW made by Dixon Industries so that rod 272, connecting unit 274, and shield 114 may be used in place of contact pin 256 and shield 254 of spindle motor 250 as shown in FIG. 14. With such an alternative, balls 164 isolate rotor hub 120 from base 102 and shield 114. Connecting unit 274 and rod 272 establish a controlled resistance electrical pathway from rotor hub 120 to ground. Instead of controlling the resistance of the electrical pathway with electric conductor 168 as shown in FIG. 9, or with contact pin 256 as shown in FIG. 14, the resistance of the electrical pathway is controlled with rod 272. Preferably, the resistance of rod 272 is selected to have a resistance greater than 10 megohms but low enough to allow static discharge. Consequently, rod 272 reestablishes an electrical pathway to rotor hub 120 to permit static discharge but does not have a resistance low enough to short circuit the magnetoresistive head when the magnetoresistive head contacts memory storage disc 106. As a result, spindle motor 270 prevents damage to magnetoresistive heads caused by static charge buildup. In addition, conducting rod 272 and connecting unit 274 utilize space within shaft 166, eliminating the need to increase the size of the spindle motor and allowing the spindle motor to be self-contained.

13. Thirteenth Embodiment (FIG. 17)

Figure 17:
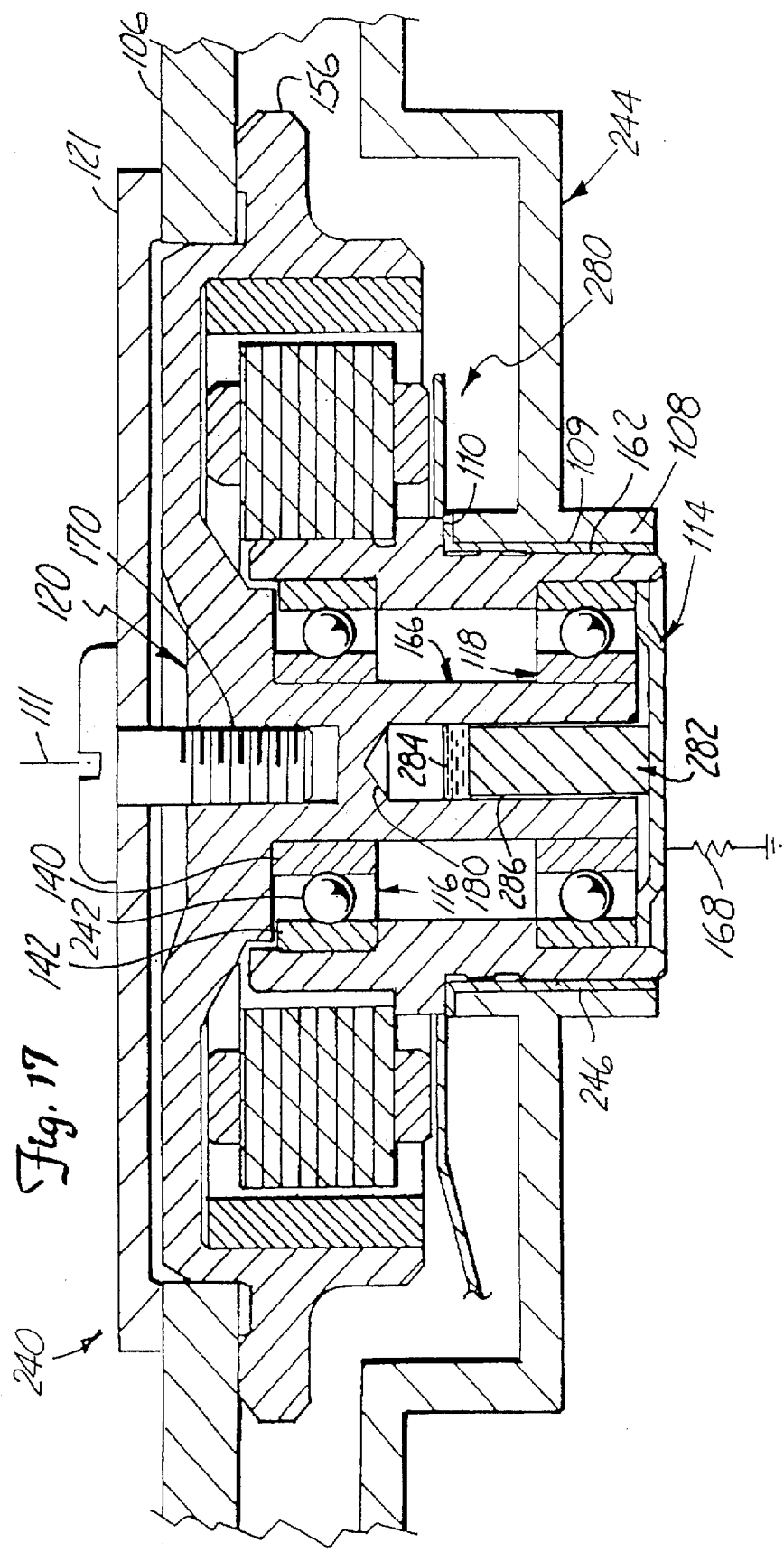
FIG. 17 is a cross-sectional view of a thirteenth embodiment of the spindle motor of FIG. 15.

FIG. 17 is a cross sectional view of an alternate embodiment 280 of spindle motor 270 shown in FIGS. 15 and 16. Spindle motor 280 is similar to spindle motor 270 except that conducting rod 272 and fluid connecting unit 274 are replaced with conducting rod 282 and conducting liquid or fluid 284. For sake of illustration, those elements of spindle motor 280 which are the same as corresponding elements of spindle motor 270 are numbered similarly. Conducting rod 282 is an elongated shaft made of a conducting material, preferably 430F stainless steel. Conducting rod 282 has an outer diameter slightly smaller than an inner diameter of housing bore 172 so as to permit shaft 166 to rotate about conducting rod 282 without interference from conducting rod 282. Conducting rod 282 extends upwardly from contact shield 114 into housing bore 172. As a result, conducting rod 282 does not increase the height of disc drive 240. Conducting rod 282 is preferably integrally formed with contact shield 114. Alternately, conducting rod 282 may be fixedly secured to contact shield 114.

Conducting fluid 284 preferably comprises a highly coherent, conducting liquid such as mercury. Conducting fluid 284 is supported above rod 282 within housing bore 172. Preferably, conducting fluid 284 is supported by rod 282. Because conducting fluid 284 is highly coherent, conducting fluid 284 does not escape through gap 286 between rod 282 and shaft 166. Consequently, conducting fluid 284 is contained above rod 282 within housing bore 172 while contacting both rod 282 and shaft 166 simultaneously. Because fluid 284 is conductive, fluid 284 electrically connects shaft 166 and rod 282. As a result, conducting fluid 284 provides an electrical pathway from shaft 166 to rod 282 without statically coupling shaft 166 to rod 282, contact shield 114 and electrical conductor 168. Shaft 166 rotates about rod 282 with minimal rotational frictional drag. Because conducting fluid 284, conducting rod 282, contact shield 114 and conductor 168 are formed from materials having a known conductivity, the conductivity, or conversely, the resistivity, between rotor hub 120 and ground is predictable and may be controlled. The resistance between rotor hub 120 and ground is preferably controlled by selecting the resistance of electrical conductor 168 to be greater than about 10 megohms but low enough so as to allow static discharge.

Alternatively, as can be appreciated, rod 282 and conducting fluid 284 may also be used in place of spring 174 and contact pin 178 of spindle motor 160 shown in FIG. 9. In addition, rod 282 may also be made from a carbon filled conducting plastic such as Rulon ECW made by Dixon Industries so that rod 282, conducting fluid 284, and shield 114 may be used in place of contact pin 256 and shield 254 of spindle motor 250 shown in FIG. 14. With such an alternative, balls 164 isolate rotor hub 120 from base 102 and shield 114. Rod 282 and conducting fluid 284 establish a controlled resistance electrical pathway from rotor hub 120 to ground. Instead of controlling the resistance of the electrical pathway with electrical conductor 168 as shown in FIG. 9, or with contact pin 256 as shown in FIG. 14, the resistance of the electrical pathway is controlled with rod 282. Preferably, the conducting plastic used to form rod 282 has a resistance low enough so as to allow static discharge but large enough, preferably greater than about 10 megohms, so as to prevent electrical shorts between the magnetoresistive head and memory storage disc 106 when the head contacts memory storage disc 106. As a result, spindle motor 280 prevents damage to magnetoresistive heads caused by static charge buildup. In addition, conducting rod 282 and conducting fluid 284 utilize space within shaft 166, eliminating the need to increase the size of the spindle motor and allowing the spindle motor to be self contained.

14. Conclusion

Disc drives 10 and 100 each include spindle motors which rotatably support the rotor hub about an axis while electrically isolating the hub from the base. Because the spindle motors electrically isolate rotor hub from the base, no rubber feet or isolation film is required to electrically isolate the entire disc drive from ground. Consequently, disc drives 10 and 100 occupy less space and may be more easily manufactured. In addition, disc drives 10 and 100 each provide a controlled resistance electrical pathway between the rotor hub and ground to control disc potential and to drain excess static charge buildup within the rotor hub and the memory storage disc. Controlling disc potential reduces or eliminates electrical arcs or sparks between the disc and the magnetic head. Consequently, damage to magnetoresistive heads or undesirable acoustics is prevented.

Disc drives 10 and 100 of the present invention also have other associated advantages not limited to disc drives having magnetoresistive heads. Bearing balls made of ceramic or ruby material improve acoustics and nonrepetitive runout and reduce contamination concerns by eliminating the need for grease. Furthermore, inserts reduce or eliminate the need for adhesives, thus eliminating a potential contamination source. The inserts also act as sound barriers to lower decibel levels of the disc drives. As a result, the disc drives operate more quietly.

As can be appreciated, the spindle motors of disc drives 10 and 100 may have alternative structural elements other than the bearing sleeve, the bearing balls and the shaft made of high resistivity material. For example, inner races 48, 140 or outer races 49, 142 could be made of high resistivity material so as to electrically isolate the rotor hub from the base. Spindle motors having other structural elements made of high resistivity material so as to electrically isolate the rotor hub from the base are intended to be within the scope of the invention. In addition, inserts and coatings made of high resistivity materials may be positioned in a variety of locations within the spindle motor so as to isolate the rotor hub from the base. Spindle motors having isolating inserts and high resistivity coatings in alternative locations are also considered to be within the scope of the invention.

Disc drive 240 includes a drive base which has an isolation layer applied to an interface surface of the base which contacts the spindle motor. Consequently, disc drive 240 electrically isolates the spindle motor from the base and ground without the need for space consuming rubber feet or grommets. As can be appreciated, isolation coating 246 may be formed on interface surfaces which have a variety of shapes and locations. For example, to effectively isolate the spindle motor from ground, it may be necessary to apply isolation coating 246 to interface surfaces on both the bottom casing or drive base and the top casing.

Although the present invention has been described with reference to preferred embodiments, workers skilled in the art will recognize that changes may be made in form and detail without departing from the spirit and scope of the invention.

What is claimed is:

1. A disc drive spindle motor for rotatably driving at least one memory storage disc confronting at least one magnetoresistive head having a sensing current, the spindle motor comprising:
 a drive base at ground;
 a rotor hub for supporting said at least one memory storage disc above the base;
 means for rotatably supporting the rotor hub above the drive base while electrically insulating the rotor hub from the base to prevent electrical short circuiting between the magnetoresistive head and ground; and
 means establishing a controlled resistance electrical pathway from the rotor hub to ground for draining static charge from the disc to the ground at a rate such that static charge remaining on the disc maintains the disc above ground potential during all periods in which the disc is rotating and the magnetoresistive head is in electrical contact with the rotating disc without thereby short circuiting the sensing current to ground through the electrical pathway.

2. The motor of claim 1 wherein the base includes an interface surface which engages the means for rotatably supporting, the means for rotatably supporting includes a high resistivity material formed on the interface surface for electrically insulating the rotor hub from the base.

3. The motor of claim 2 wherein the high resistivity material is a hard anodized metallic layer formed upon the interface surface.

4. The motor of claim 2 wherein the high resistivity material is an epoxy coating applied to the interface surface.

5. The motor of claim 2 wherein the means for rotatably supporting includes a bearing sleeve fixedly coupled to the base, wherein the high resistivity material formed on the interface surface of the base engages the bearing sleeve.

6. The motor of claim 1 wherein the means for rotatably supporting includes a layer of high resistivity material formed on an interface surface of the means for rotatably supporting, wherein the high resistivity material engages the base.

7. The motor of claim 6 wherein the high resistivity material includes an epoxy coating deposited upon the interface surface of the means for rotatably supporting.

8. The motor of claim 1 wherein the means establishing the controlled resistance electrical pathway includes:
 a shaft electrically coupled to the rotor hub and defining an inner bore;
 a contact shield extending below the shaft;
 an electrical conductor electrically grounding the contact shield, the electrical conductor having a controlled resistance for draining static charge from the disc to ground at a rate such that remaining static charge on the disc maintains the disc above ground potential during all periods in which the magnetoresistive head is in electrical contact with the rotating disc without thereby short circuiting the sensing current to ground through the electrical conductor;
 a rod made of conductive material extending from the contact shield and received within the inner bore of the shaft; and
 means for providing an intermediate electrical pathway from the shaft to the rod while permitting the shaft to rotate about the rod.

9. The motor of claim 8 wherein the means for providing the intermediate electrical pathway from the shaft to the rod includes:

a seal positioned within the inner bore;

a magnetic conductive material coupled to the rod; and a conductive ferro-fluid between the seal and the magnetic conductive material.

10. The motor of claim 8 wherein the means for providing the intermediate electrical pathway from the shaft to the rod includes:

a conducting liquid electrically connecting the shaft to the rod.

11. The motor of claim 10 wherein the conducting liquid comprises mercury.

12. The motor of claim 1 wherein the means establishing the controlled resistance electrical pathway includes:

a shaft electrically coupled to the rotor hub and defining an inner bore;

a contact shield extending below the shaft;

a rod made of a conducting plastic having a controlled resistance, the rod extending from the contact shield and received within the inner bore of the shaft, wherein the controlled resistance controls disc potential by draining static charge from the disc to ground at a rate such that remaining charge on the disc maintains the disc above ground potential during all periods in which the magnetoresistive head is in electrical contact with the rotating disc without thereby short circuiting the sensing current to ground through the rod; and means for providing an intermediate electrical pathway from the shaft to the rod while permitting the shaft to rotate about the rod.

13. The motor of claim 1 wherein the means for rotatably supporting includes bearing means coupled to the base for supporting the rotor hub, at least a portion of the bearing means being made of a high resistivity material for electrically isolating the rotor hub from the base to prevent electrical short circuiting through the bearing means between the magnetoresistive head and ground.

14. The motor of claim 13 wherein the bearing means includes a first race coupled to the base, a second race coupled to the rotor hub, and ball bearings rotatably supported between the first and second races, the ball bearings being made of the high resistivity material for electrically isolating the rotor hub from the base to prevent electrical short circuiting through the bearing means between the magnetoresistive head and ground.

15. The motor of claim 1 including a shaft rigidly mounted to the base, the means for rotatably supporting includes bearing means coupled to the shaft for supporting the rotor hub, at least a portion of the bearing means being made of a high resistivity material for electrically isolating the rotor hub from the base to prevent electrical short circuiting through the bearing means between the magnetoresistive head and ground.

16. The motor of claim 15 wherein the bearing means includes a first race coupled to the shaft, a second race coupled to the rotor hub, and ball bearings rotatably supported between the first and second races, the ball bearings being made of the high resistivity material for electrically isolating the rotor hub from the base to prevent electrical short circuiting through the bearing means between the magnetoresistive head and ground.

17. The motor of claim 1 wherein the means for rotatably supporting the rotor hub includes an interface surface made of a high resistivity electrically insulating material supported on the base electrically insulating the base from the rotor hub, and wherein the means establishing the controlled resistance electrical pathway includes a shaft electrically coupled to the rotor hub and defining an inner bore, a contact shield extending below the shaft, a rod made of conductive material extending from the contact shield and received within the inner bore of the shaft, means for providing an intermediate electrical pathway from the shaft to the rod while permitting the shaft to rotate about the rod, and an electrical conductor electrically grounding the contact shield, the electrical conductor including controlled resistance means for draining static charge from the disc to ground at a rate such that remaining static charge on the disc maintains the disc above ground potential during all periods in which the magnetoresistive head is in electrical contact with the rotating disc without thereby short circuiting the sensing current to ground through the electrical conductor.

18. The motor of claim 17 wherein the means for providing the intermediate electrical pathway from the shaft to the rod includes:

a seal positioned within the inner bore;

a magnetic conductive material coupled to the rod; and a conductive ferro-fluid between the seal and the magnetic conductive material.

19. The motor of claim 17 wherein the means for providing the intermediate electrical pathway from the shaft to the rod includes:

a conducting liquid electrically connecting the shaft to the rod.

20. The motor of claim 19 wherein the conducting liquid comprises mercury.

21. The motor of claim 1 wherein the means establishing the controlled resistance electrical pathway includes a shaft electrically coupled to the rotor hub and defining an inner bore;

a contact shield extending below the shaft;

a rod made of a conducting plastic having a controlled resistance for draining static charge from the disc to ground at a rate such that remaining static charge on the disc maintains the disc above ground potential during all periods in which the magnetoresistive head is in electrical contact with the rotating disc without thereby short circuiting the sensing current to ground through the rod; and means for providing an intermediate electrical pathway from the shaft to the rod while permitting the surface to rotate about the rod.

22. The motor of claim 1 wherein the rotor hub has an axis and the means for rotatably supporting the rotor hub comprises;

a shaft coupled to the rotor hub and extending along the axis, the shaft being made of a high resistivity material for electrically isolating the rotor hub from the base to prevent electrical short circuiting between the magnetoresistive head and ground through the shaft, and a plurality of ball bearing units coupled to the rotor hub and spaced along the axis between the shaft and the rotor hub, wherein the ball bearing units wholly support rotation of the rotor hub about the axis.

23. The motor of claim 22 wherein the high resistivity material is a ceramic material.

24. The motor of claim 22 wherein the means establishing the controlled resistance electrical pathway includes:

an electrically conductive ferro-fluid seal between the shaft and the rotor hub; and an electrical conductor electrically connecting the ferro-fluid seal to ground, the electrical conductor having a controlled resistance for draining static charge from the disc to the ground at a rate such that remaining static charge on the disc maintains the disc above ground potential during all periods in which the magnetoresistive head is in electrical contact with the rotating disc without thereby short circuiting the sensing current to ground through the electrical conductor.

25. The disc drive spindle motor of claim 22 wherein the shaft is fixedly coupled to the drive base along the axis and wherein the plurality of ball bearing units are coupled between the shaft and the rotor hub for supporting rotation of the rotor hub about the axis.

26. The motor of claim 22 wherein the shaft is fixedly coupled to the base and extending concentrically within the rotor hub, the motor including a high resistivity isolator secured to the shaft, the isolator having a resistance large enough to prevent electrical short circuits between the magnetoresistive head and ground through the shaft, and wherein the means establishing the controlled resistance electrical pathway includes an electrically conductive ferro-fluid seal between the rotor hub and the high resistivity isolator; and means secured to the electrically conductive ferro-fluid seal for providing a controlled resistance electrical pathway to ground for draining static charge from the disc to the ground at a rate such that remaining static charge on the disc maintains the disc above ground potential during all periods in which the magnetoresistive head is in electrical contact with the rotating disc without thereby short circuiting of the sensing current to ground through the electrical pathway.

27. The motor of claim 22 wherein the shaft is fixedly coupled to the base and extending concentrically within the rotor hub, wherein the means establishing the controlled resistance electrical pathway includes:

a high resistivity isolator secured to the shaft for providing a controlled resistance electrical pathway to ground for draining static charge from the disc to the ground at a rate such that remaining static charge on the disc maintains the disc above ground potential during all periods in which the magnetoresistive head is in electrical contact with the rotating disc without thereby short circuiting of the sensing current to ground through the electrical pathway, and an electrically conductive ferro-fluid seal between the rotor hub and the high resistivity isolator.

28. The motor of claim 1 wherein the means establishing the controlled resistance electrical pathway includes a shaft electrically coupled to the rotor hub and defining an inner bore;

a conducive contact shield extending below the shaft;

a conducive rod extending from the contact shield and received within the inner bore of the shaft;

a coherent electrically conductive liquid above the rod between the rod and the shaft, wherein the coherency of the liquid maintains the liquid above the rod and wherein the liquid provides an electrical pathway from the shaft to the rod while permitting the shaft to rotate about the rod; and an electrical conductor electrically grounding the contact shield, the electrical conductor having a controlled resistance for draining static charge from the disc to ground at a rate such that remaining static charge on the disc maintains the disc above ground potential during all periods in which the magnetoresistive head is in electrical contact with the rotating disc without thereby short circuiting the sensing current to ground through the electrical conductor.

29. The motor of claim 28 wherein the conductive liquid comprises mercury.

30. The motor of claim 1 wherein the means establishing the controlled resistance electrical pathway includes a shaft electrically coupled to the rotor hub and defining an inner bore;

a conductive contact shield extending below the shaft;

an electrical conductor electrically grounding the contact shield;

a rod having a controlled resistance for draining static charge from the disc to the ground at a rate such that remaining static charge on the disc maintains the disc above ground potential during all periods in which the magnetoresistive head is in electrical contact with the rotating disc without thereby short circuiting the sensing current to ground through the rod; and a coherent electrically conductive liquid above the rod between the rod and the shaft, wherein the coherency of the liquid maintains the liquid above the rod and wherein the liquid provides an electrical pathway from the shaft to the rod while permitting the shaft to rotate about the rod.

31. The motor of claim 1 wherein the means establishing the controlled resistance electrical pathway includes a shaft electrically coupled to the rotor hub and defining an inner bore;

a rod received within the inner bore of the shaft, wherein the rod is made of a conducting plastic having a controlled resistance for draining static charge from the disc to ground at a rate such that remaining static charge on the disc maintains the disc above ground potential during all periods in which the magnetoresistive head is in electrical contact with the rotating disc without thereby short circuiting of the sensing current to ground through the rod; and means for providing an electrical pathway from the shaft to the rod while permitting the shaft to rotate about the rod.

32. The motor of claim 31 wherein the means establishing the controlled resistance electrical pathway further includes a conductive contact shield extending below the shaft and an electrical conductor electrically grounding the contact shield.

33. The motor of claim 30 wherein the conducive liquid comprises mercury.

34. The motor of claim 1 wherein the means rotatably supporting includes a shaft fixedly coupled to the drive base, the rotor hub encircling the shaft, and a plurality of ball bearing units between the shaft and the rotor hub for wholly supporting rotation of the rotor hub about the shaft, the shaft being made of a high resistivity material for electrically isolating the rotor hub from the base to prevent electrical short circuiting between the magnetoresistive head and ground through the shaft;

and further wherein the means establishing the controlled resistance electrical pathway includes an electrically conductive ferro-fluid seal between the shaft and the rotor hub; and an electrical conductor electrically connecting the ferrofluid seal to ground, the electrical conductor having a controlled resistance for draining static charge from the disc to the ground at a rate such that remaining static charge on the disc maintains the disc above ground potential during all periods in which the magnetoresistive head is in electrical contact with the rotating disc without thereby short circuiting of the sensing current to ground through the electrical conductor.

35. The motor of claim 34 wherein the high resistivity material is a ceramic material.

36. A disc drive spindle motor for rotatably driving at least one memory storage disc confronted by a magnetoresistive head having a sensing current, the spindle motor comprising:

a drive base;

a rotor hub for supporting the at least one memory storage disc above the base;

means for rotatably driving the rotor hub about an axis;

a shaft electrically connected to the rotor hub, the shaft being made of a conductive material;

a contact shield electrically connected to ground;

bearing means coupled to the contact shield for supporting the rotor hub, at least a portion of the bearing means being made of a high resistivity material for electrically isolating the rotor hub from the base to prevent electrical short circuiting through the bearing means between the magnetoresistive head and ground;

a contact button having a contact area electrically connected to the shaft and operably coupled to the contact shield, wherein the contact area is made of a conducting plastic having a controlled resistance for draining static charge through the contact button and the contact shield from the disc to the ground at a rate such that static charge remaining on the disc maintains the disc above ground potential during all periods in which the disc is rotating and the magnetoresistive head is in electrical contact with the rotating disc without thereby short circuiting the sensing current to ground through the contact button.

37. The motor of claim 36 wherein the contact shield comprises:

a plate having an outer periphery and a central portion integrally extending below the periphery and spring biased to contact the contact area of the contact button to operably couple the contact shield to the contact area.

38. The motor of claim 36 wherein the shaft further defines an inner bore and wherein the contact button is received within the inner bore to electrically connect the contact area to the shaft.

39. A disc drive spindle motor for rotatably driving at least one memory storage disc in confrontation with at least one magnetoresistive head having a sensing current, the spindle motor comprising:

a drive base;

a rotor hub for supporting the at least one memory storage disc above the base;

a shaft coupled to the rotor hub;

a bearing sleeve encircling at least a portion of the shaft;

a contact shield within the bearing sleeve and below the shaft;

an electrical conductor electrically connecting the contact shield to ground;

a bearing unit coupled between the shaft and the bearing sleeve, the bearing unit including:
an outer race coupled to the bearing sleeve;
an inner race coupled to the shaft; and
a bearing ball rotatably supported between the inner race and the outer race to rotatably support the shaft concentrically within the bearing sleeve wherein the bearing ball is made of a high resistivity material for electrically isolating the rotor hub from the base to prevent electrical short circuiting through the bearing unit between the magnetoresistive head and ground; and means establishing a controlled resistance electrical connection between the shaft and the contact shield for draining static charge through the controlled resistance electrical connection and the electrical conductor from the disc to the ground at a rate such that static charge remaining on the disc maintains the disc above ground potential during all periods in which the disc is rotating and the magnetoresistive head is in electrical contact with the rotating disc without thereby short circuiting the sensing current to ground through the electrical connection, while permitting the shaft to rotate above the contact shield.

40. The motor of claim 39 wherein the means establishing the controlled resistance electrical connection includes:

a conductive contact button protruding from the shaft; and means for urging the contact button and the contact shield into contact with each other.

41. A disc drive spindle motor for rotatably driving at least one memory storage disc, the spindle motor comprising:

a drive base;

a rotor hub for supporting the at least one memory storage disc above the base;

a shaft coupled to the rotor hub, wherein the shaft defines an inner bore;

a bearing sleeve encircling the shaft and coupled to the drive base;

a bearing unit coupled between the bearing sleeve and the shaft, the bearing unit including:
an outer race coupled to the bearing sleeve;
an inner race coupled to the shaft; and
a bearing ball rotatably supported between the inner race and the outer race to rotatably support the shaft relative to the bearing sleeve;

a contact shield fit within the bearing sleeve and extending below the shaft to seal contaminates from the bearing unit within the bearing sleeve, the contact shield having a raised periphery abutting the outer race of the bearing unit and a depressed central portion integrally extending below the raised periphery and spaced from the inner race and the shaft to permit the inner race and the shaft to rotate;

an electrical connector electrically grounding the contact shield; and a conducting mechanism received within the inner bore of the shaft and electrically connecting the shaft to the depressed central portion of the contact shield, wherein the conducting mechanism has a controlled resistance small enough to control disc potential and impede static charge buildup.

* * * * *

UNITED STATES PATENT AND TRADEMARK OFFICE
CERTIFICATE OF CORRECTION

PATENT NO. : 5,729,404
DATED : March 17, 1998
INVENTOR(S) : John C. Dunfield et al.

It is certified that error appears in the above-identified patent and that said Letters Patent is hereby corrected as shown below:

Col. 3, line 49, delete "bails", insert --balls--

Col. 6, line 32, delete "56 inner", insert --56. Inner--

Col. 7, line 19, delete "Lip", insert --up--

Col. 7, line 21, delete "t4", insert --14--

Col. 7, line 54, delete "bails", insert --balls--

Col. 8, line 27, delete "front", insert --from--

Col. 9, line 48, delete "bails", insert --balls--

Col. 9, line 55, delete "bails", insert --balls--

Col. 12, line 28, delete "buildtip", insert --buildup--

Col. 14, line 5, delete "bails", insert --balls--

UNITED STATES PATENT AND TRADEMARK OFFICE
CERTIFICATE OF CORRECTION

PATENT NO. : 5,729,404

DATED : March 17, 1998

INVENTOR(S) : JOHN C. DUNFIELD ET AL.

It is certified that error appears in the above-identified patent and that said Letters Patent is hereby corrected as shown below:

Col. 17, line 4, delete "shah", insert --shaft--

Col. 17, line 8, delete "shah", insert --shaft--

Col. 17, line 47, delete "ting", insert --ring--

Col. 17, line 62, delete "2 12", insert --212--

Col. 26, line 48, delete "surface", insert --shaft--

Signed and Sealed this

Eighteenth Day of May, 1999

Q. TODD DICKINSON

Attest:

Attesting Officer

Acting Commissioner of Patents and Trademarks